United States Patent
Williams et al.

(10) Patent No.: US 10,648,598 B2
(45) Date of Patent: May 12, 2020

(54) FERRULE FOR A CONDUIT FITTING

(71) Applicant: Swagelok Company, Solon, OH (US)

(72) Inventors: Peter C. Williams, Cleveland Heights, OH (US); Donald E. Negrelli, Gates Mills, OH (US); Mark D. Bearer, Akron, OH (US)

(73) Assignee: SWAGELOK COMPANY, Solon, OH (US)

( * ) Notice: Subject to any disclaimer, the term of this patent is extended or adjusted under 35 U.S.C. 154(b) by 423 days.

(21) Appl. No.: 15/428,194

(22) Filed: Feb. 9, 2017

(65) Prior Publication Data
US 2017/0254451 A1    Sep. 7, 2017

Related U.S. Application Data

(60) Provisional application No. 62/292,959, filed on Feb. 9, 2017.

(51) Int. Cl.
*F16L 19/065* (2006.01)
*F16L 19/10* (2006.01)

(52) U.S. Cl.
CPC .............. *F16L 19/065* (2013.01); *F16L 19/10* (2013.01)

(58) Field of Classification Search
CPC ................................ F16L 19/065; F16L 19/10
USPC ............................... 285/341, 342, 389, 382.7
See application file for complete search history.

(56) References Cited

U.S. PATENT DOCUMENTS

| 1,548,533 | A | 8/1925 | Laderer |
| 1,595,310 | A | 8/1926 | Mueller et al. |
| 1,772,536 | A | 8/1930 | Cox |
| 2,301,280 | A | 11/1942 | Howe |
| 2,943,871 | A * | 7/1960 | St Clair .................. F16L 19/10 285/342 |
| 3,103,373 | A | 9/1963 | Lennon et al. |
| 3,201,153 | A | 8/1965 | Currie |

(Continued)

FOREIGN PATENT DOCUMENTS

| AU | 2006295825 | 4/2007 |
| CA | 2400675 | 9/2001 |

(Continued)

OTHER PUBLICATIONS

International Search Report and Written Opinion from PCDT/US2017/017099 dated May 8, 2017.

*Primary Examiner* — Zachary T Dragicevich
(74) *Attorney, Agent, or Firm* — Calfee, Halter & Griswold LLP

(57) ABSTRACT

A ferrule for a conduit fitting includes an interior wall extending along a central axis through the ferrule between first and second end portions of the ferrule, so that the ferrule can be installed over a conduit end. The first end portion of the ferrule includes an axially outer first end driven surface disposed at a first angle between 70° and 90° with respect to the central axis, and an axially inner first end camming surface disposed at a second angle between 0° and 40° with respect to the central axis. The second end portion of the ferrule includes an axially outer second end driven surface disposed at a third angle substantially equal to the first angle, and an axially inner second end camming surface disposed at a fourth angle substantially equal to the second angle.

20 Claims, 15 Drawing Sheets

(56) References Cited

U.S. PATENT DOCUMENTS

| | | | |
|---|---|---|---|
| 3,290,069 A * | 12/1966 | Davis | F16L 19/10 |
| | | | 285/341 |
| 3,834,742 A * | 9/1974 | McPhillips | 285/382.7 X |
| 3,866,958 A | 2/1975 | Gold | |
| 3,907,335 A * | 9/1975 | Burge | 285/382.7 X |
| 5,028,078 A | 7/1991 | Schwarz et al. | |
| 5,119,937 A | 1/1992 | Reynolds, Jr. | |
| 5,720,504 A | 2/1998 | Stedman et al. | |
| 6,073,976 A | 6/2000 | Schmidt et al. | |
| 6,131,963 A | 10/2000 | Williams et al. | |
| 6,527,303 B2 | 3/2003 | Kariyama et al. | |
| 7,374,212 B1 | 5/2008 | Gretz | |
| 7,871,110 B2 | 1/2011 | Ostergaard et al. | |
| 8,616,586 B2 | 12/2013 | Ostergaard et al. | |
| 8,870,237 B2 * | 10/2014 | Sindelar | 285/382.7 |
| 2003/0025331 A1 | 2/2003 | Williams et al. | |
| 2003/0197378 A1 | 10/2003 | Allstead et al. | |
| 2010/0102554 A1 | 4/2010 | Xu | |
| 2011/0204618 A1 | 8/2011 | Bearer et al. | |

FOREIGN PATENT DOCUMENTS

| | | |
|---|---|---|
| CA | 2357780 | 3/2002 |
| CN | 101018969 | 8/2007 |
| CN | 101415985 | 4/2009 |
| DE | 19519016 | 11/1996 |
| DE | 19855795 | 6/2000 |
| DE | 10011146 | 9/2001 |
| DE | 60119154 | 2/2007 |
| EP | 895014 | 2/1999 |
| EP | 1247039 | 10/2002 |
| EP | 1936250 | 6/2008 |
| EP | 1995504 | 11/2008 |
| EP | 2128509 | 12/2009 |
| ES | 2260295 | 11/2006 |
| FR | 2171506 | 9/1973 |
| FR | 2873184 | 1/2006 |
| GB | 704281 | 2/1954 |
| GB | 749395 | 5/1956 |
| GB | 1028663 | 5/1966 |
| GB | 1361372 | 7/1974 |
| GB | 2121133 | 12/1983 |
| JP | H0893975 | 4/1996 |
| JP | H11223286 | 8/1999 |
| JP | H11248075 | 9/1999 |
| JP | 2000110975 | 4/2000 |
| JP | 2007162741 | 6/2007 |
| JP | 2010084880 | 4/2010 |
| JP | 2011106539 | 6/2011 |
| JP | 2012-225354 | 11/2012 |
| WO | 2001/066989 | 9/2001 |
| WO | 2002/057678 | 7/2002 |
| WO | 2006/018407 | 2/2006 |
| WO | 2010/0278894 | 3/2010 |

* cited by examiner

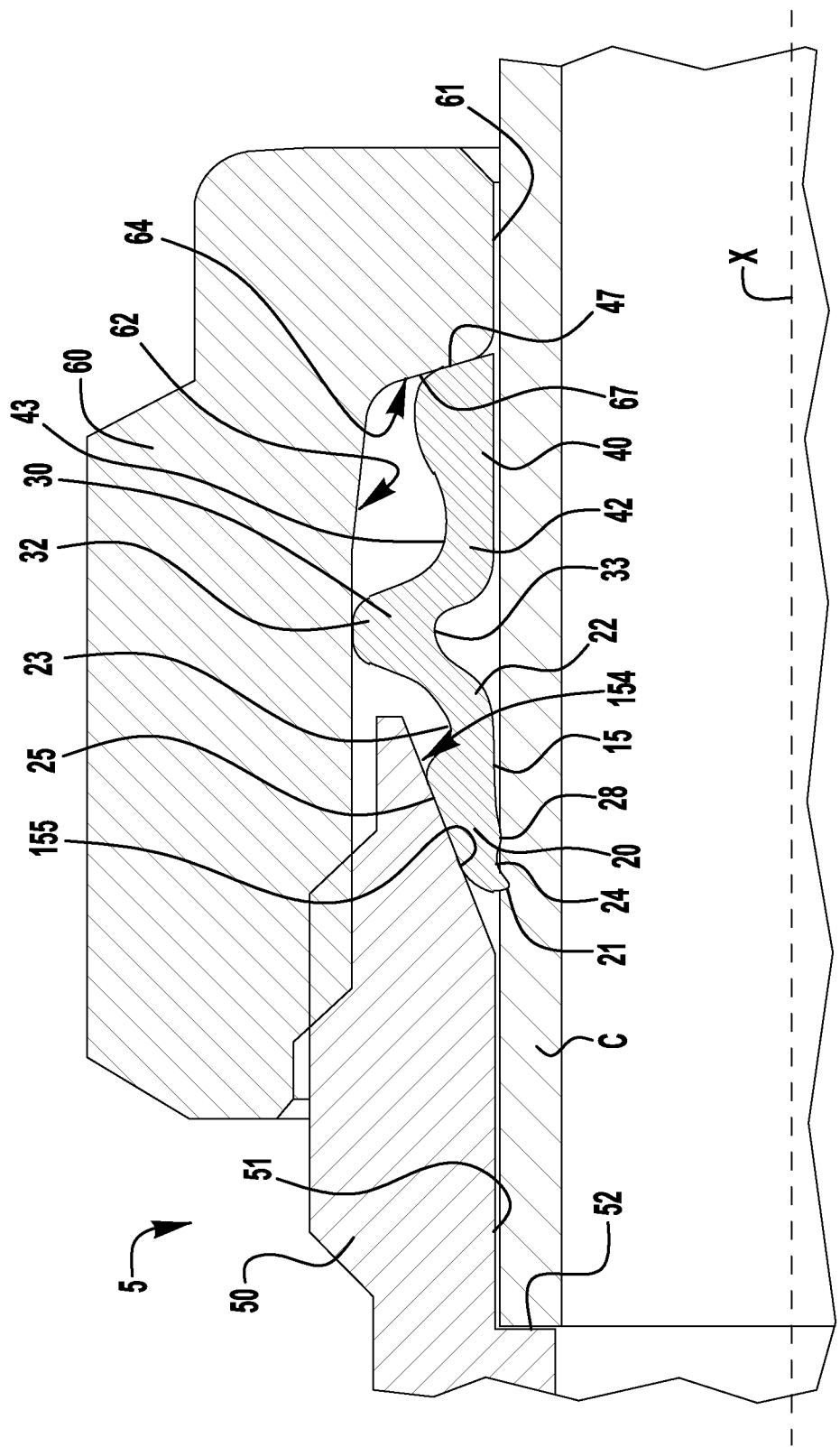

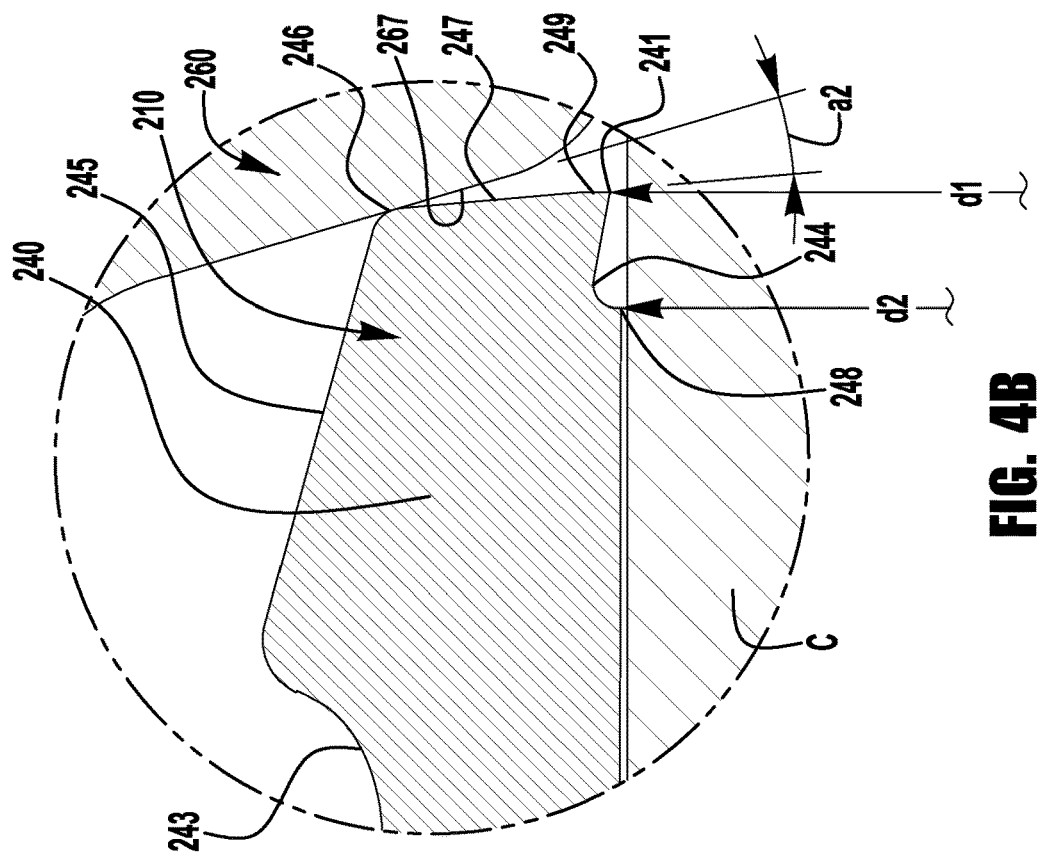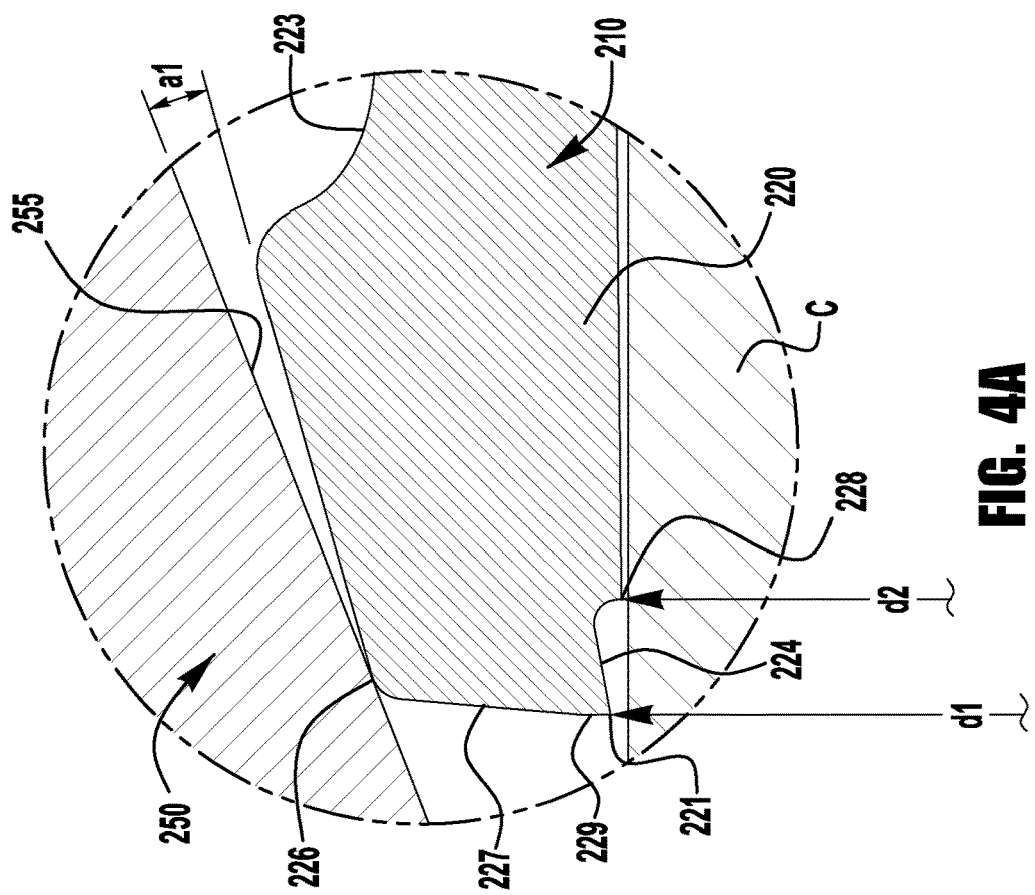

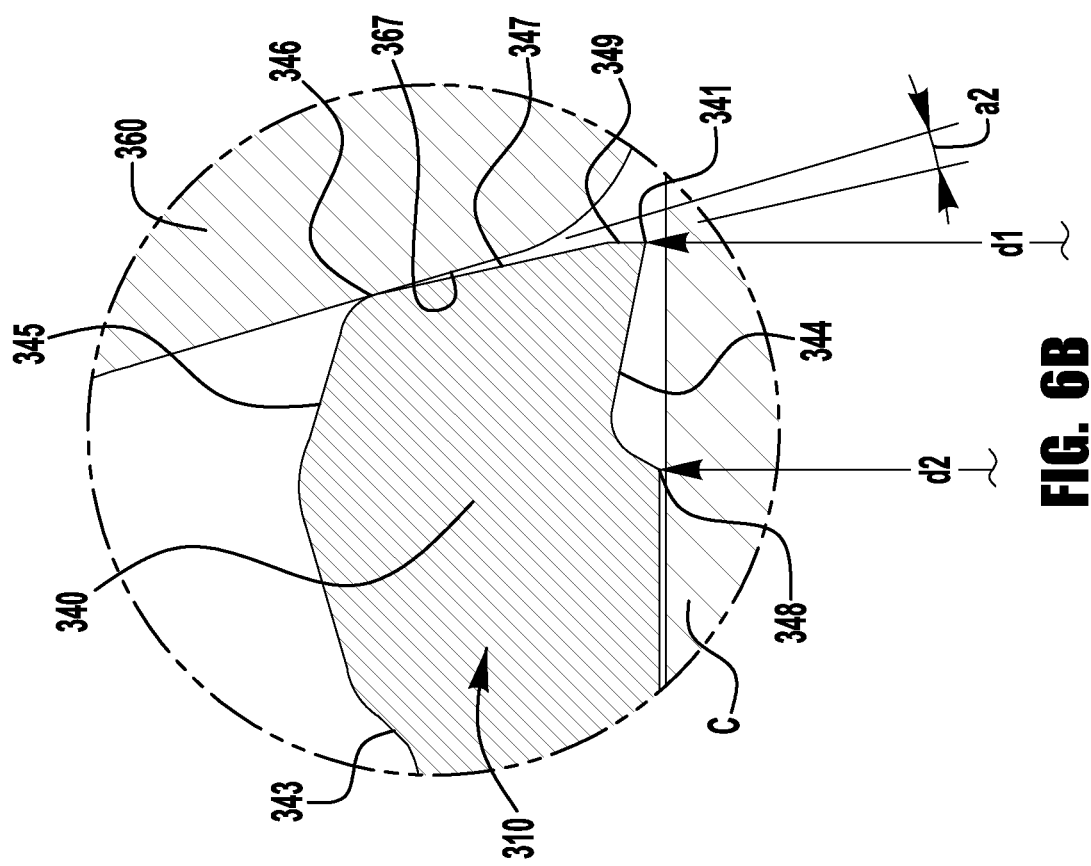
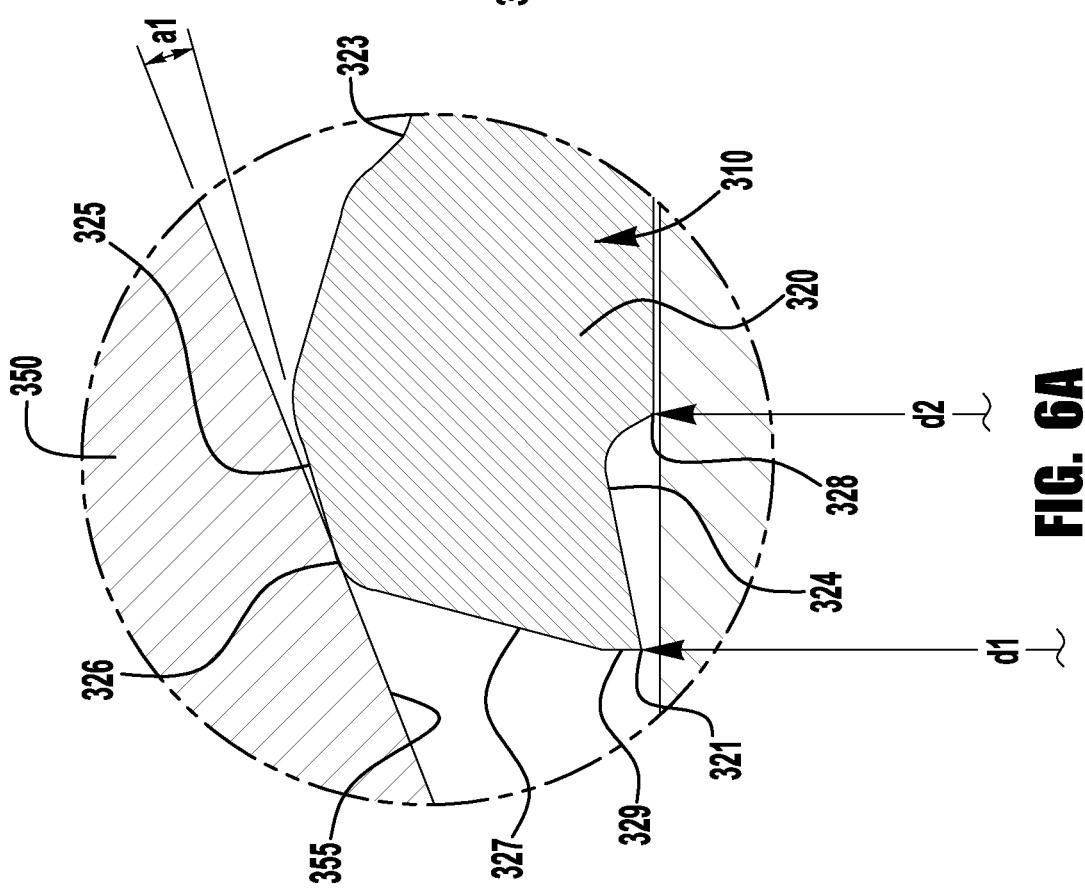

FERRULE FOR A CONDUIT FITTING

CROSS-REFERENCE TO RELATED APPLICATIONS

This application claims priority to and all benefit of U.S. Provisional Patent Application Ser. No. 62/292,959, filed on Feb. 9, 2016, for FERRULE FOR A CONDUIT FITTING, the entire disclosure of which is fully incorporated herein by reference.

TECHNICAL FIELD OF THE INVENTIONS

The present disclosure relates to fittings for making mechanically attached connections between a conduit and another fluid component, for containing liquid or gas fluids. More particularly, the disclosure relates to fittings for tube and pipe conduits that use a conduit gripping device, such as for example, a ferrule.

SUMMARY OF THE DISCLOSURE

In accordance with an embodiment of one or more of the inventions presented in this disclosure, a ferrule for a conduit fitting includes an interior wall extending along a central axis through the ferrule between first and second end portions of the ferrule, so that the ferrule can be installed over a conduit end. The first end portion of the ferrule includes an axially outer first end driven surface disposed at a first angle between 60° and 90° with respect to the central axis, and an axially inner first end camming surface disposed at a second angle between 0° and 40° with respect to the central axis. The second end portion of the ferrule includes an axially outer second end driven surface disposed at a third angle substantially equal to the first angle, and an axially inner second end camming surface disposed at a fourth angle substantially equal to the second angle.

In accordance with another embodiment of one or more of the inventions presented in this disclosure, a ferrule for a conduit fitting includes an interior wall extending along a central axis through the ferrule so that the ferrule can be installed over a conduit end, an enlarged first end portion including a first end camming surface disposed at a first angle with respect to the central axis, a first narrowed portion axially inward of and necked down from the enlarged first end portion, an enlarged second end portion including a second end driven surface disposed at a second angle with respect to the central axis, the second angle being greater than the first angle, a second narrowed portion axially inward of and necked down from the enlarged second end portion, and a central boss portion disposed axially between and extending radially outward from the first and second narrowed portions.

In accordance with another embodiment of one or more of the inventions presented in this disclosure, a ferrule is provided in combination with a first fitting component (e.g., a female threaded fitting nut) including an interior bore for receiving a conduit end therethrough and an annular interior shoulder that forms a drive surface. The ferrule includes an interior wall extending along a central axis through the ferrule between first and second end portions of the ferrule, so that the ferrule can be installed over a conduit end, a first hinge portion axially inward of the first end portion, and a second hinge portion axially inward of the second end portion. The first end portion of the ferrule includes a first end driven surface disposed at a first angle between 60° and 90° with respect to the central axis. The second end portion of the ferrule includes a second end driven surface disposed at a second angle with respect to the central axis, the second angle being substantially equal to the first angle. When the ferrule and the first fitting component are assembled with a second fitting component (e.g., a male threaded fitting body), with the first end portion of the ferrule engaging the second fitting component and the second end portion of the ferrule engaging the first fitting component, and the conduit fitting is completely installed (e.g., completely pulled up) on a conduit end to compress the first end portion into gripping and sealing engagement with the conduit end, the second hinge portion hinges radially inward to prevent compression of the second end portion against the conduit end. When the ferrule and the first fitting component are assembled with the second fitting component with the first end portion of the ferrule engaging the first fitting component and the second end portion of the ferrule engaging the second fitting component, and the conduit fitting is completely installed on a conduit end to compress the second end portion into gripping and sealing engagement with the conduit end, the first hinge portion hinges radially inward to prevent compression of the first end portion against the conduit end.

In accordance with another embodiment of one or more of the inventions presented in this disclosure, a ferrule is provided in combination with a first fitting component (e.g., a female threaded fitting nut) including an interior bore for receiving a conduit end therethrough and an annular interior shoulder that forms a drive surface. The ferrule includes an interior wall extending along a central axis through the ferrule between first and second end portions of the ferrule, so that the ferrule can be installed over a conduit end. The first end portion of the ferrule includes a first end driven surface disposed at a first angle between 70° and 90° with respect to the central axis. The second end portion of the ferrule including a second end driven surface disposed at a second angle with respect to the central axis, the second angle being substantially equal to the first angle. When the ferrule is installed in the first fitting component with the first end portion engaging the shoulder of the first fitting component, the drive surface of the first fitting component engages the first end driven surface of the ferrule to form a radially inward opening first difference angle between the first end driven surface and the drive surface. When the ferrule is installed in the first fitting component with the second end portion engaging the shoulder of the first fitting component, the drive surface of the first fitting component engages the second end driven surface of the ferrule to form a radially inward opening second difference angle between the second end driven surface and the drive surface, the second difference angle being substantially equal to the first difference angle.

In accordance with another embodiment of one or more of the inventions presented in this disclosure, a ferrule is provided in combination with a first fitting component (e.g., a male threaded fitting body) including an interior bore for receiving a conduit end and a camming mouth defining a fitting component camming surface. The ferrule includes an interior wall extending along a central axis through the ferrule between first and second end portions of the ferrule, so that the ferrule can be installed over a conduit end, a first hinge portion axially inward of the first end portion, and a second hinge portion axially inward of the second end portion. The first end portion of the ferrule includes a first end camming surface disposed at a first angle between 0° and 40° with respect to the central axis. The second end portion of the ferrule includes a second end camming surface disposed at a second angle substantially equal to the first angle. When the ferrule and the first fitting component are assembled with a second fitting component (e.g., a female threaded fitting nut), with the first end portion of the ferrule engaging the first fitting component and the second end portion of the ferrule engaging the second fitting component, and the conduit fitting is completely installed (e.g., completely pulled up) on a conduit end, the first hinge portion hinges radially inward to collet the conduit end. When the ferrule and the first fitting component are assembled with the second fitting component, with the first end portion of the ferrule engaging the second fitting component and the second end portion of the ferrule engaging the first fitting component, and the conduit fitting is completely installed on a conduit end, the second hinge portion hinges radially inward to collet the conduit end.

In accordance with another embodiment of one or more of the inventions presented in this disclosure, a ferrule is provided in combination with a first fitting component (e.g., a male threaded fitting body) including an interior bore for receiving a conduit end and a camming mouth defining a fitting component camming surface. The ferrule includes an interior wall extending along a central axis through the ferrule between first and second end portions of the ferrule, so that the ferrule can be installed over a conduit end. The first end portion of the ferrule includes a first end camming surface disposed at a first angle between 0° and 40° with respect to the central axis, and a first end driven surface disposed at a second angle with respect to the central axis, the second angle being greater than the first angle, with the first end camming surface and the first end driven surface being joined by a first radius portion. The second end portion of the ferrule includes a second end camming surface disposed at a third angle substantially equal to the first angle, and a second end driven surface disposed at a fourth angle with respect to the central axis, the fourth angle being greater than the third angle, with the second end camming surface and the second end driven surface being joined by a second radius portion. When the ferrule is installed in the first fitting component with the first end portion engaging the camming mouth of the first fitting component, the fitting component camming surface of the first fitting component engages the first end camming surface of the ferrule at the first radius portion to form a radially outward opening first difference angle between the first end camming surface and the fitting component camming surface. When the ferrule is installed in the first fitting component with the second end portion engaging the camming mouth of the first fitting component, the fitting component camming surface of the first fitting component engages the second end camming surface of the ferrule at the second radius portion to form a radially outward opening second difference angle between the second end camming surface and the fitting component camming surface.

In accordance with another embodiment of one or more of the inventions presented in this disclosure, a fitting assembly includes a first fitting component (e.g., a male threaded fitting body) having an interior bore for receiving a conduit end and a camming mouth defining a fitting component camming surface, a second fitting component (e.g., a female threaded fitting nut) joinable with the first fitting component and having an interior bore for receiving the conduit end therethrough and an annular interior shoulder that forms a drive surface, and a ferrule including an interior wall extending along a central axis through the ferrule between first and second end portions of the ferrule, so that the ferrule can be installed over the conduit end, a first hinge portion axially inward of the first end portion, and a second hinge portion axially inward of the second end portion. When the fitting assembly is assembled with the first end portion of the ferrule engaging the first fitting component and the second end portion of the ferrule engaging the second fitting component, and the conduit fitting is completely installed (e.g., completely pulled up) on a conduit end, the first hinge portion of the ferrule hinges radially inward to collet the conduit end and the second hinge portion of the ferrule hinges radially inward to prevent compression of the second end portion of the ferrule against the conduit end. When the fitting assembly is assembled with the second end portion of the ferrule engaging the first fitting component and the first end portion of the ferrule engaging the second fitting component, and the conduit fitting is completely installed on a conduit end, the second hinge portion of the ferrule hinges radially inward to collet the conduit end and the first hinge portion of the ferrule hinges radially inward to prevent compression of the second end portion against the conduit end.

In accordance with another embodiment of one or more of the inventions presented in this disclosure, a fitting assembly includes a first fitting component (e.g., a male threaded fitting body) having an interior bore for receiving a conduit end and a camming mouth defining a fitting component camming surface, a second fitting component (e.g., a female threaded fitting nut) joinable with the first fitting component and having an interior bore for receiving the conduit end therethrough and an annular interior shoulder that forms a drive surface, and a ferrule including an interior wall extending along a central axis through the ferrule so that the ferrule can be installed over the conduit end, a first end portion having a first end camming surface disposed at a first angle with respect to the central axis, a second end portion having a second end driven surface disposed at a second angle with respect to the central axis, the second angle being greater than the first angle, a first hinge portion axially inward of the first end portion, a second hinge portion axially inward of the second end portion, and a central boss portion disposed axially between the first and second hinge portions. When the fitting assembly is assembled with the first end portion of the ferrule engaging the first fitting component and the second end portion of the ferrule engaging the second fitting component, and the fitting is completely installed (e.g., completely pulled up) on a conduit end, the first hinge portion of the ferrule hinges radially inward to collet the conduit end, the second hinge portion of the ferrule hinges radially inward to prevent compression of the second end portion against the conduit end, and the central boss portion bows radially outward to engage an interior surface of the second fitting component.

In accordance with another embodiment of one or more of the inventions presented in this disclosure, a ferrule for a conduit fitting includes an interior wall extending along a central axis through the ferrule so that the ferrule can be installed over a conduit end. The ferrule includes enlarged first and second end portions, and first and second narrowed portions axially inward of and necked down from the corresponding enlarged first and second end portions. An enlarged central portion of the ferrule is disposed axially between and extending radially outward from the first and second narrowed portions. The ferrule is symmetrical about a plane that bisects an axial center point of the ferrule.

In accordance with another embodiment of one or more of the inventions presented in this disclosure, a ferrule for a conduit fitting includes an interior wall extending along a central axis through the ferrule between first and second end portions of the ferrule, so that the ferrule can be installed over a conduit end. The first end portion of the ferrule includes an axially outer first end driven surface disposed at a first angle with respect to the central axis, an axially inner first end camming surface disposed at a second angle with respect to the central axis, the second angle being smaller than the first angle, and a first radius portion joining the first end driven surface with the first end camming surface. The second end portion of the ferrule includes an axially outer second end driven surface disposed at a third angle substantially equal to the first angle, an axially inner second end camming surface disposed at a fourth angle substantially equal to the second angle, and a second radius portion joining the second end driven surface with the second end camming surface. The ferrule is symmetrical about a plane that bisects an axial center point of the ferrule.

In accordance with another embodiment of one or more of the inventions presented in this disclosure, a ferrule for a conduit fitting includes an interior wall extending along a central axis through the ferrule between first and second end portions so that the ferrule can be installed over a conduit end, with the ferrule including first and second axial sides. The first axial side of the ferrule includes an axially outer and radially inner first end camming surface disposed at a first angle with respect to the central axis, an axially inner and radially outer first end driven surface disposed at a second angle with respect to the central axis, the second angle being greater than the first angle, and a first hinge portion extending between the first end camming surface and the first end driven surface. The second axial side of the ferrule includes an axially outer and radially inner second end camming surface disposed at a third angle substantially equal to the first angle, an axially inner and radially outer second end driven surface disposed at a fourth angle substantially equal to the second angle, and a second hinge portion extending between the second end camming surface and the second end driven surface. The ferrule is symmetrical about a plane that bisects an axial center point between the first and second axial sides of the ferrule.

In accordance with another embodiment of one or more of the inventions presented in this disclosure, a ferrule for a conduit fitting includes an interior wall extending along a central axis through the ferrule so that the ferrule can be installed over a conduit end, with the ferrule including first and second axial sides. An enlarged first end portion is disposed on the first axial side of the ferrule and includes a first end camming surface disposed at a first angle with respect to the central axis. A first narrowed portion is disposed on the first axial side of the ferrule axially inward of and necked down from the enlarged first end portion. A central boss portion is disposed at an axial center point of the ferrule and extends radially outward from the first narrowed portion, with the central boss portion defining a second end driven surface disposed on the second axial side of the ferrule at a second angle with respect to the central axis, the second angle being greater than the first angle.

These and other aspects and advantages of the inventions described herein will be readily appreciated and understood by those skilled in the art in view of the accompanying drawings.

BRIEF DESCRIPTION OF THE DRAWINGS

FIG. 1B is a half-longitudinal cross-sectional schematic view of the conduit fitting assembly of FIG. 1A, shown in a pulled-up condition;

FIG. 4A is an enlarged view of the circled region of FIG. 4 labeled 4A;

FIG. 4B is an enlarged view of the circled region of FIG. 4 labeled 4B;

FIG. 6A is an enlarged view of the circled region of FIG. 6 labeled 6A;

FIG. 6B is an enlarged view of the circled region of FIG. 6 labeled 6B;

DESCRIPTION OF THE EXEMPLARY EMBODIMENTS

Figure 1A:
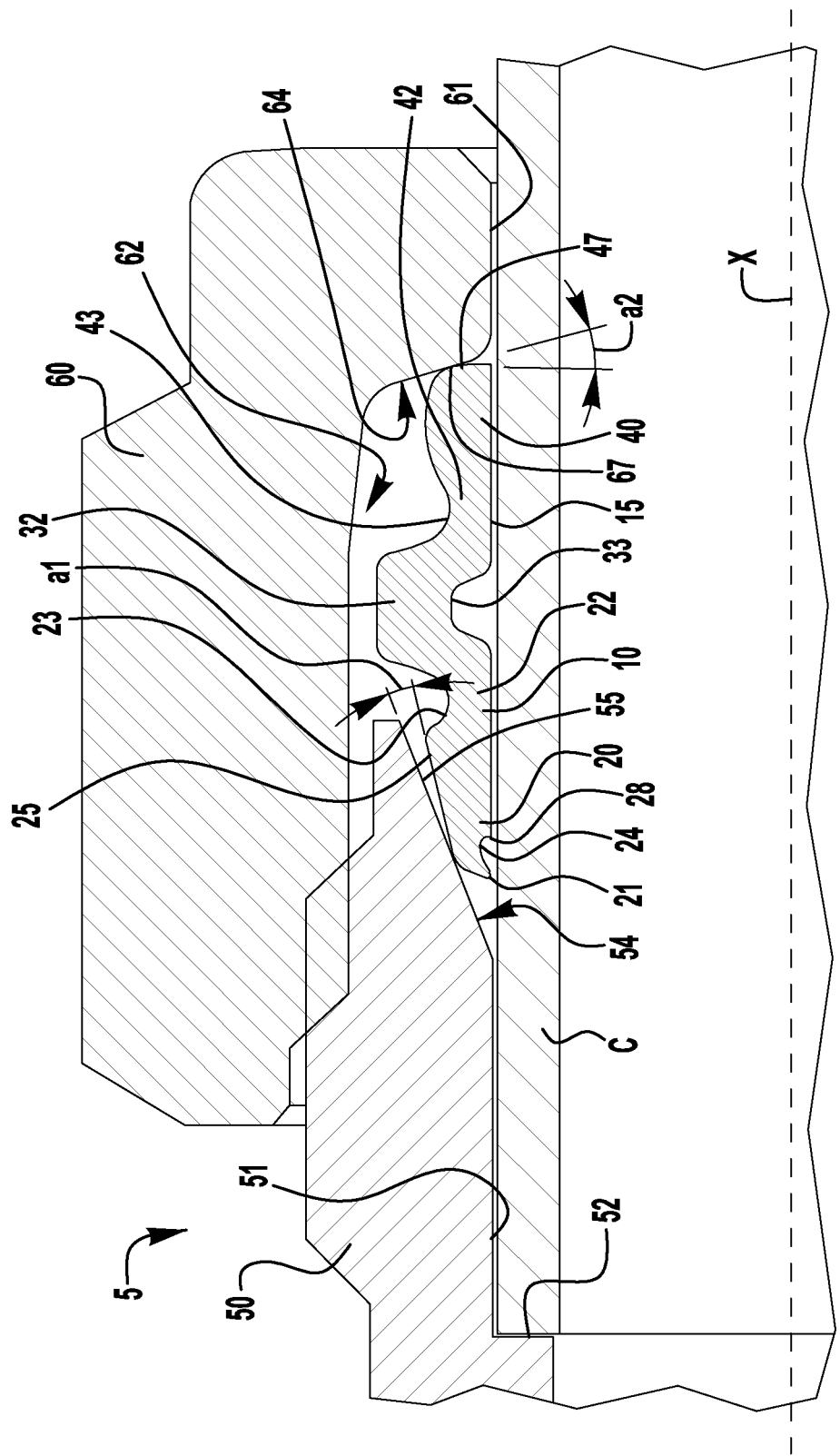
FIG. 1A is a half-longitudinal cross-sectional schematic view of a conduit fitting assembly, shown in a finger tight condition.

Although the exemplary embodiments herein are presented in the context of a stainless steel tube fitting, the inventions herein are not limited to such applications, and will find use with many different conduits such as tube and pipe as well as different materials other than 316 stainless steel, including metals (e.g., brass, steel, nickel alloys) and non-metals for either the conduit, the gripping devices or the fitting components or any combination thereof. The inventions may also be used for liquid or gas fluid systems. While the inventions herein are illustrated with respect to particular designs of the conduit gripping devices and fitting components, the inventions are not limited to use with such designs, and will find application in many different fitting designs that use one or more conduit gripping devices. We use the term "conventional" to refer to commercially available or later developed parts or parts that are otherwise commonly known, used or that those of ordinary skill in the art would be familiar with in general, as distinguished from parts that may be modified in accordance with teachings herein. The inventions may be used with tube or pipe, so we use the term "conduit" to include tube or pipe or both. We generally use the term "fitting assembly" or "fitting" interchangeably as a shorthand reference to an assembly of typically first and second fitting components along with one or more conduit gripping devices. The concept of a "fitting assembly" thus may include assembly of the parts onto a conduit, either in a finger-tight position, a partial pull-up position or complete pull-up position; but the term "fitting assembly" is also intended to include an assembly of parts together without a conduit, for example for shipping or handling, as well as the constituent parts themselves even if not assembled together.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Fittings typically include two fitting components that are joined together (often a threaded fitting body and nut), and one or more gripping devices (often a ferrule or ferrules), however, the inventions herein may be used with fittings that include additional components. For example, a union fitting may include a body and two nuts. We also use the term "fitting remake" and derivative terms herein to refer to a fitting assembly that has been at least once tightened or completely pulled-up, loosened, and then re-tightened to another completely pulled-up position. Remakes may be done with the same fitting assembly parts (e.g. nut, body, ferrules), for example, or may involve the replacement of one of more of the parts of the fitting assembly. Reference herein to "outboard" and "inboard" are for convenience and simply refer to whether a direction is towards the center of a fitting (inboard) or away from the center (outboard). In the drawings, various gaps and spaces between parts (for example, gaps between the ferrules and the conduit in a finger-tight position) may be somewhat exaggerated for clarity or due to scale of the drawings.

A fitting body and nut (or other such fitting components) are typically provided with a pull-up mechanism for causing the gripping device to be installed on a conduit end so as to grip the conduit end and provide a seal against leakage. The term "pull-up" simply refers to the operation of tightening the tube fitting assembly so as to complete the assembly of the fitting onto the tube end with the desired tube grip and seal. In other embodiments contemplated by the present application, a compression fitting may include first and second fitting components that are pressed together, clamped, or otherwise installed for compression of a ferrule by installation of the first and second fitting components on a conduit end, and/or fitting components that are designed to be installed only once, without remakes.

Usually a metal tube fitting is first assembled in a "finger tight" condition and then a wrench or other suitable tool is used to tighten or "pull up" the fitting to its final initial and complete assembled condition. In some cases, especially for larger tube sizes, a swaging tool is used to pre-install a ferrule onto the tubing. The pull up mechanism most commonly used is a threaded connection of a female threaded nut component and a male threaded body component, with the tube gripping device being acted upon by these two components as they are threaded and tightened together. The body includes a tube end receiving bore with an angled body camming surface at the outer portion of that bore. The most commonly used camming surfaces are frusto-conical such that the term "camming angle" refers to the cone angle of the camming surface relative to the tube end longitudinal axis or outer surface. The tube end is axially inserted into the body bore and extends past the frusto-conical camming surface. The gripping device is slipped onto the tube end and the nut is partially threaded onto the body to the finger tight position such that the tube gripping device captured axially between the camming surface and the nut. The nut typically includes an inward shoulder having a drive surface that drives the tube gripping device into engagement with the angled camming surface on the body as the nut and body components are threadably tightened together. The angled camming surface imparts a radial compression to the tube gripping device, forcing the tube gripping device into a gripping engagement with the tube end. The compressed tube gripping device typically forms a seal against the outer surface of the tubing and also against the angled camming surface.

In a conventional two ferrule tube fitting, a first or front ferrule achieves a seal by camming against the fitting body camming surface during pull-up, compressing against the tube end in a biting action, and a second or back ferrule performs a tube grip function by camming against a rear camming surface of the front ferrule during pull-up, with the front end of the back ferrule being compressed inward to grip the tube end. Exemplary two ferrule fittings are described in U.S. Pat. Nos. 6,131,963 and 3,103,373, the entire disclosures of which are incorporated herein by reference.

A single ferrule tube fitting, as the name implies, uses a single ferrule to accomplish both the tube grip and seal functions. For many conventional single ferrule tube fittings, a biting action (as achieved by the front ferrule in a conventional two ferrule design) is accomplished by having the single ferrule bow in a radially outward direction from the tube wall in the central region or mid-portion of the single ferrule body between the front and back ends thereof. During pull-up of such a single ferrule fitting, the front end of the ferrule is driven against the angled camming surface of the body by the nut pushing against the back end of the ferrule. This bowing action helps direct the front end of the single ferrule into the tube end, and also causes the back end of the single ferrule to likewise engage and grip the tube end. This is commonly accomplished by providing an angled drive surface on the nut shoulder that engages the back end of the single ferrule so as to radially compress the back end of the ferrule into a gripping action on the tube end. In some such single ferrule designs, the back end of the ferrule apparently is intended to bite into the tube end. This back end tube grip is sometimes used with the single ferrule in order to attempt to improve the tube fitting's performance under vibration because the back end grip attempts to isolate outboard-tube vibration from affecting the front end tube bite.

The use of a back end tube grip actually works against the effort to grip the tube end at the front end of the single ferrule. Ideally, the single ferrule should be completely in three dimensional compression between the nut and the camming surface of the body. Providing a back end grip actually places a counter acting tension to the single ferrule that works against the front end compression being used to provide the tube grip. Additionally, the outward bowing action tends to work against the effort to grip the tube at the front end of the single ferrule because, in order to enable the outward bowing action, the single ferrule requires a lessened mass that is adjacent the tube gripping "bite." As such, traditional bowing single ferrules are generally less efficient at transferring axial force to the ferrule bite since energy is lost in the radial action of bowing.

As one aspect of the present application, a single ferrule may be configured to provide an adequate front end grip and seal without compression of the ferrule back end against the tube end. In one such embodiment, a ferrule may include a first hinge portion axially inward of a first end portion of the ferrule and configured to hinge radially inward upon complete pull-up against a fitting body to collet the first hinge portion against the tube end, and a second hinge portion axially inward of a second end portion of the ferrule and configured to hinge radially inward upon pull-up against a fitting nut to maintain the second end portion in a radially uncompressed condition. While a central portion of the ferrule may bow radially outward during pull-up, the dual hinging portions of the ferrule limit this outward bowing action and maintain a compressed and colleting front portion of the ferrule.

FIGS. 1A and 1B schematically illustrate an exemplary fitting assembly 5 including a single ferrule 10 that is assembled between a first fitting component 50 (e.g., a fitting body) and a second fitting component 60 (e.g., a fitting nut). The first fitting component 50 includes a central longitudinal bore 51 that is sized to receive a conduit end C, which may bottom out against a counterbore 52 within the first fitting component 50. The longitudinal bore 51 extends to a camming mouth 54 defining a camming surface 55. The second fitting component 60 includes a central bore 61 sized to receive the conduit end C, and an annular internal shoulder 64 defining a drive surface 67. The ferrule 10 and the first and second fitting components 50, 60 may be provided in 316 stainless steel or any other suitable materials, including other metals, such as brass, steel, and nickel alloys. The ferrule 10 may, for example, be a partially or fully case hardened stainless steel ferrule (e.g., a low temperature carburized or otherwise case hardened, or fully through hardened stainless steel ferrule).

Note that in the drawings herein, the fittings or fitting components are illustrated in longitudinal or half-longitudinal cross-section, it being understood by those skilled in the art that the fitting components are in practice annular parts about a longitudinal centerline axis or central axis X. All references herein to "radial" and "axial" are referenced to this central axis except as otherwise noted. In the illustrated embodiments herein, the ferrules are circumferentially uniform, or rotationally symmetrical about the central axis. In other embodiments, ferrules including one or more of the inventive features described herein may be circumferentially discontinuous, for example, including one or more longitudinal splits, ribs, or grooves around the circumference of the ferrule.

The ferrule 10 includes an interior wall 15 extending between first and second end portions 20, 40 of the ferrule and along a central longitudinal axis X to receive the conduit end C. The exemplary ferrule further includes first and second hinge portions 22, 42 disposed axially inward of the end portions 20, 40. The ferrule 10 may be assembled between the first and second fitting components 50, 60 such that the first end portion 20 of the ferrule 10 engages the first fitting component 50 and the second end portion 40 engages the second fitting component 60. When the second fitting component 60 is pulled up with the first fitting component 50 on a conduit C, as shown in FIG. 1B, the ferrule 10 is axially compressed between the camming surface 55 of the first fitting component 50 and the drive surface 67 of the second fitting component 60. This axial compression causes the first and second hinge portions 22, 42 to hinge radially inward, compressing the first hinge portion 22 into colleting engagement with the conduit end C, and causing the second end portion 40 to pivot radially outward about the second hinge portion 42. While a central portion 30 of the ferrule 10 may bow radially outward, the location of the hinge portions 22, 42 axially inward of the ferrule end portions 20, 40 may serve to limit this outward bowing deformation, as compared to a conventional single ferrule that lacks these dual hinge portions.

Many different types of hinge portions may be utilized to provide for radially inward hinging resulting from axial compression of the ferrule. For example, variations in material properties (e.g., type of material, hardness, etc.), ferrule surface contours, and/or wall thickness at the hinge portions may promote a hinging action. In the illustrated schematic example, the hinge portions 22, 42 are narrowed with respect to, or necked down from, the end portions 20, 40 of the ferrule 10, defining outer circumferential notches or recesses 23, 43 that promote radially inward hinging at the hinge portions 22, 42, in response to axial compressive forces against the relatively larger ferrule end portions 20, 40. To facilitate two discrete radially inward hinging actions at the axially spaced hinge portions 22, 42, the central portion 30 of the ferrule 10 may include an enlarged, radially extending central boss portion 32 to resist hinging deformation at this central portion and to concentrate hinging deformation at the narrowed hinge portions. Additionally or alternatively, the central portion 30 of the ferrule 10 may include an interior circumferential notch or recess 33 to further facilitate spaced hinging actions at the first and second hinge portions 22, 42 by promoting an accordion-like axial compression of the ferrule 10.

The dual radial inward hinging and axial compression of the ferrule 10 during fitting pull-up causes a radially outward bowing of the central portion 30 of the ferrule between the hinge portions 22, 42. According to another aspect of the present application, the enlarged central boss portion 32 of the ferrule 10, defining a radially outermost surface of the ferrule, may be sized to engage an interior wall 62 of the second fitting component 60 during fitting pull-up as a result of this radially outward bowing. This contact with the second fitting component may limit further outward bowing of the ferrule, and may provide additional hinging load to the hinge portions 22, 42, and additional colleting load to the first hinge portion 22.

To extend conduit engagement at the first end portion 20 of the ferrule 10, axially outward of the first hinge portion 22, the camming surface 55 of the first fitting component 50 may be provided at a relatively shallow camming angle, with respect to the central axis X of the ferrule 10, selected to apply a desired radial compressive force to the first end portion 20 during pull-up, to direct a biting edge 21 of the first end portion, extending around the ferrule interior wall 15, into biting engagement with the conduit end C. To further direct this biting edge 21 into biting engagement with the conduit end, the first end portion 20 of the ferrule may be provided with a camming surface 25 that engages the first component camming surface 55 to form a radially outward opening difference angle a1. As the fitting is pulled up, the radial compressive forces from the component camming surface 55 are applied to a narrow band of contact on the first end camming surface 25 of the ferrule, causing this portion to deform radially inward, diminishing the difference angle a1 until a larger portion of the first end camming surface engages and seals against the component camming surface 55.

Figure 1C:
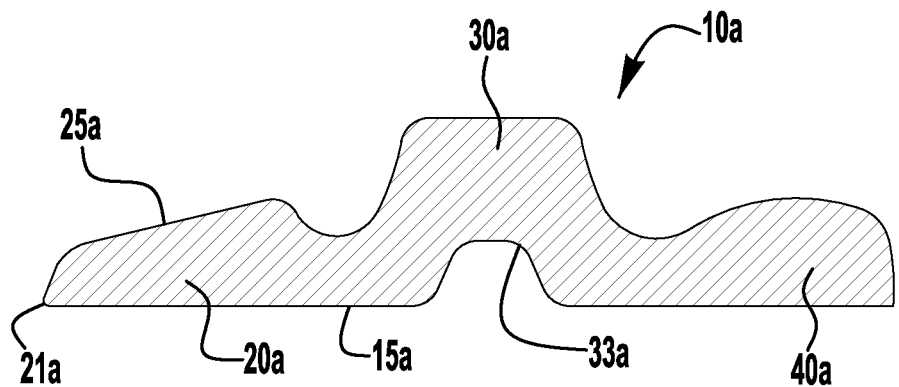
FIG. 1C is a half-longitudinal cross-section view of another ferrule for a conduit fitting assembly, duplicating some of the features of the ferrule of FIG. 1A.

According to another aspect of the present application, the conduit biting first end portion of the ferrule may be provided with one or more additional biting edges or rings for additional biting engagement of the conduit end. As shown in the schematic embodiment of FIGS. 1A and 1B, rearward of the outer biting edge 21 is a circumferential notch 24, axially spacing the outer biting edge from a second, axially inner biting edge 28, to form separate outer and inner biting rings of engagement with the conduit end C during pull-up. As the radial compression of the first end portion during pull-up is concentrated at the outer biting edge 21, the outer biting edge may be disposed at a larger diameter d1 than the inner biting edge 28, with this difference in biting edge diameters being selected to allow the outer and inner biting edges to contact the conduit end synchronously during fitting pull-up. In other embodiments, as shown in FIG. 1C, a ferrule 10a may be provided without a circumferential notch, such that a single, outer biting ring is formed at the outer biting edge 21a during pull-up.

To further limit or prevent radial inward compression of the second end portion 40 of the ferrule 10, axially outward of the second hinge portion 42, the drive surface 67 of the second fitting component 60 may be provided at a relatively steep angle with respect to the ferrule central axis X, sufficient to adequately center the ferrule within the second fitting component, while minimizing any radial compressive forces against the second end portion of the ferrule. To further direct the second end portion 40 away from engagement with the conduit end C, the second end portion of the ferrule may be provided with a driven surface 47 that engages the second component drive surface 67 to form a radially inward opening difference angle a2. As the fitting is pulled up, the axial compressive forces from the component drive surface 67 are applied to a narrow band of contact on the second end driven surface 47 of the ferrule 10, causing the radially inward portion of the second end portion 40 to deform axially and radially outward, diminishing the difference angle a2 until a larger portion of the second end driven surface engages against the component drive surface 67.

According to another aspect of the present application, a ferrule may be configured to be functionally symmetrical or reversible within a fitting, for installation with either a first end portion or a second end portion engaging the camming surface of the first fitting component (e.g., fitting body), and the other of the first and second end portions engaging the drive surface of the second fitting component (e.g., fitting nut), such that the body engaging end portion provides an adequate front end grip and seal without rear end compression of the nut engaging end portion against the conduit end. By providing a functionally symmetrical or reversible ferrule configuration, a "fool-proof" installation of the ferrule in a fitting may be offered, as the fitting would function properly with the ferrule installed in either direction. In accordance with exemplary embodiments of the present application, one or more of the hinging features, camming surface engaging features, drive surface engaging features, ferrule biting features, and fitting nut bore engaging features, as described above and in greater detail below, may be symmetrical about a plane that bisects an axial center point of the ferrule to provide a functionally symmetrical or reversible ferrule that provides an adequate front end grip and seal without rear end compression against the conduit end.

As used herein, a "functionally symmetrical" ferrule may include a ferrule having features or elements that are not symmetrical about a plane that bisects an axial center point of the ferrule, but that do not affect the gripping, colleting, hinging or other such actions of the ferrule. These asymmetrical elements may be provided, for example, for tooling, machining, or marking purposes. In other embodiments, the ferrule may be fully symmetrical about a plane that bisects an axial center point of the ferrule.

Figure 2C:
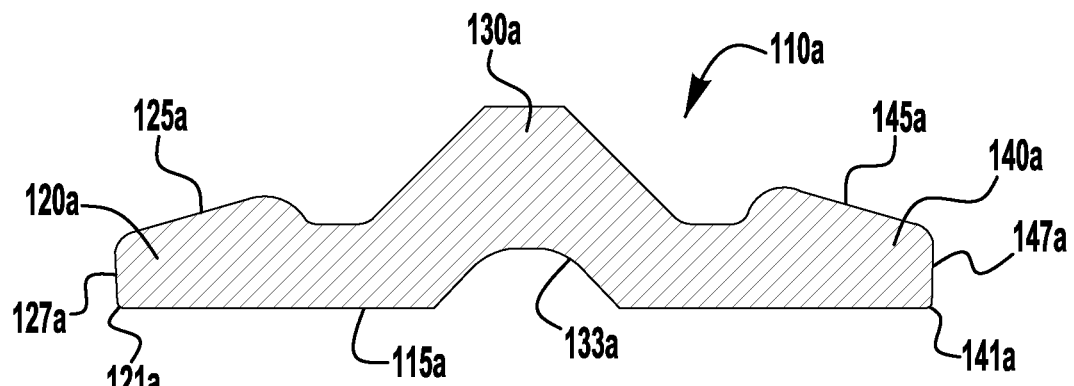
FIG. 2C is a half-longitudinal cross-section view of another ferrule for a conduit fitting assembly, duplicating some of the features of the ferrule of FIG. 2.
Figure 2:
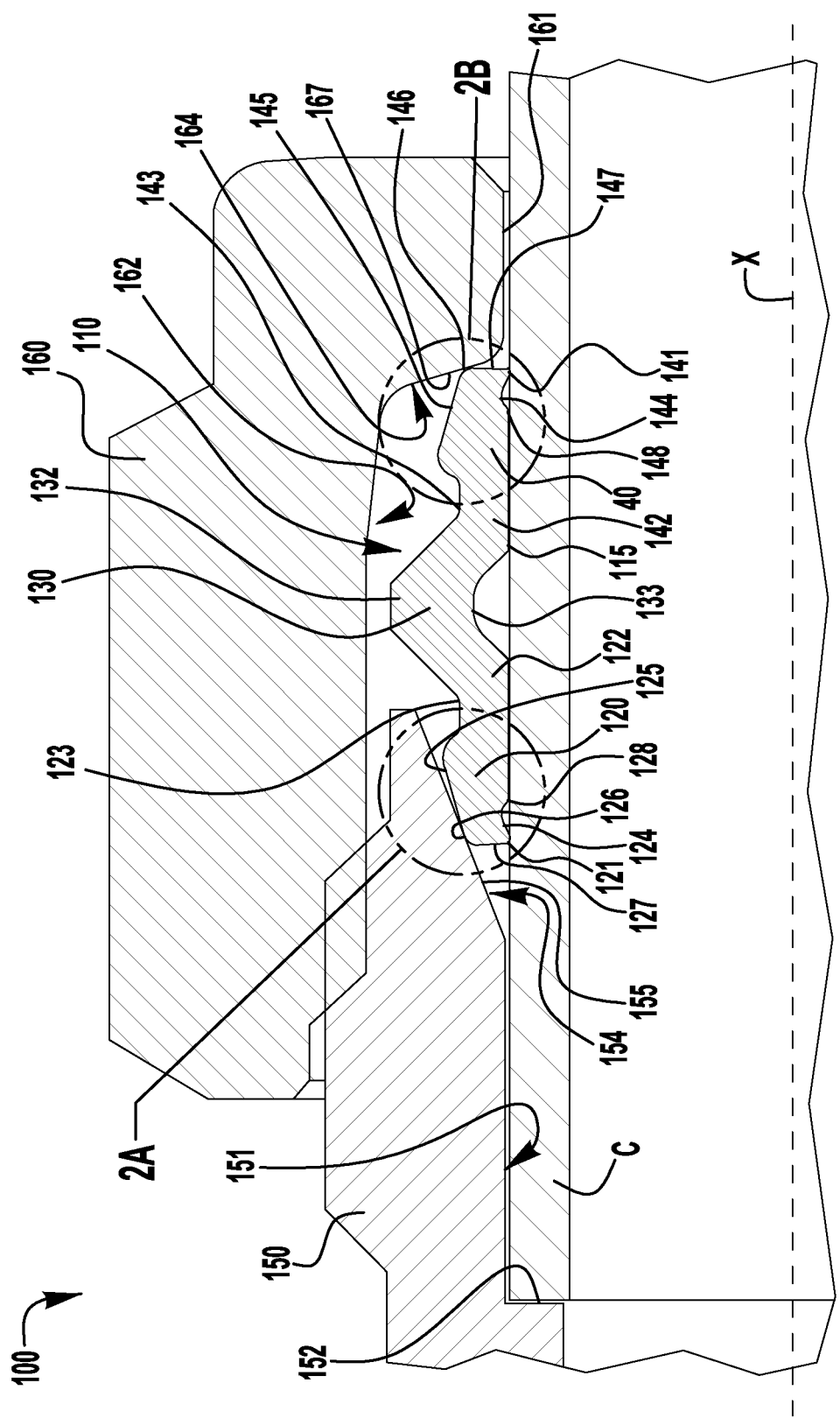
FIG. 2 is a half-longitudinal cross-sectional view of a conduit fitting assembly, shown in a finger tight condition.
Figure 2B:
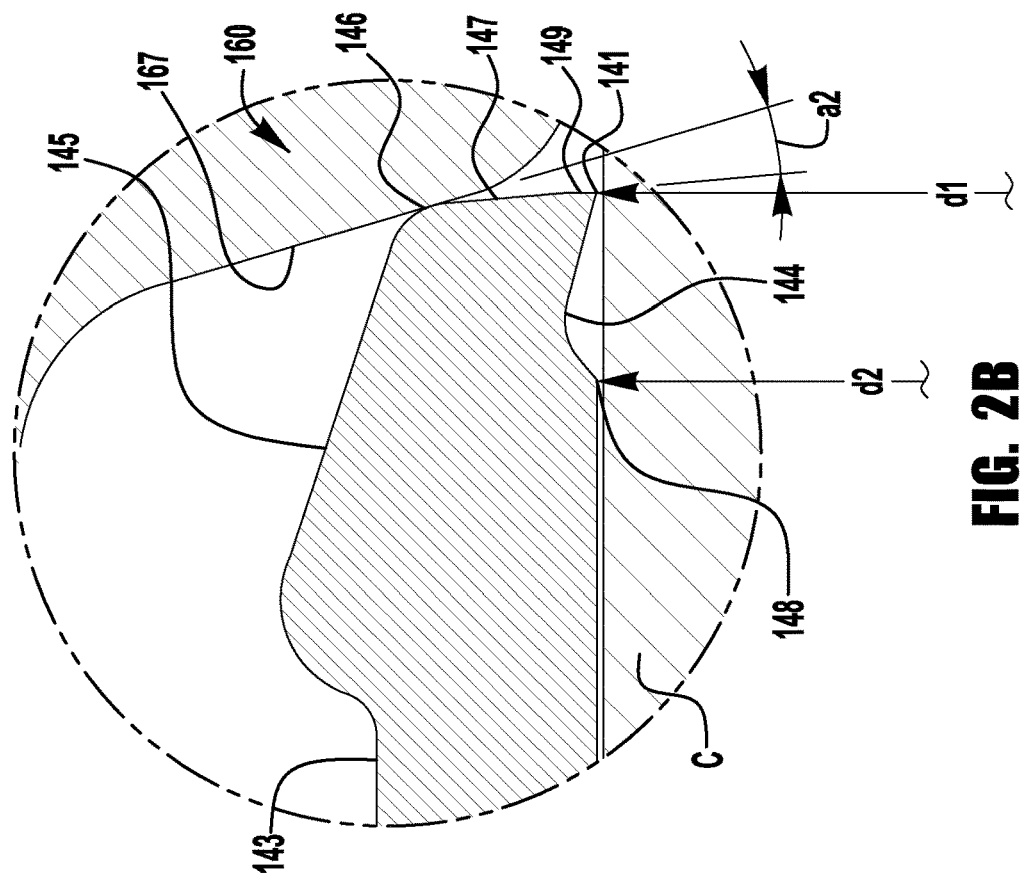
FIG. 2B is an enlarged view of the circled region of FIG. 2 labeled 2B.
Figure 2A:
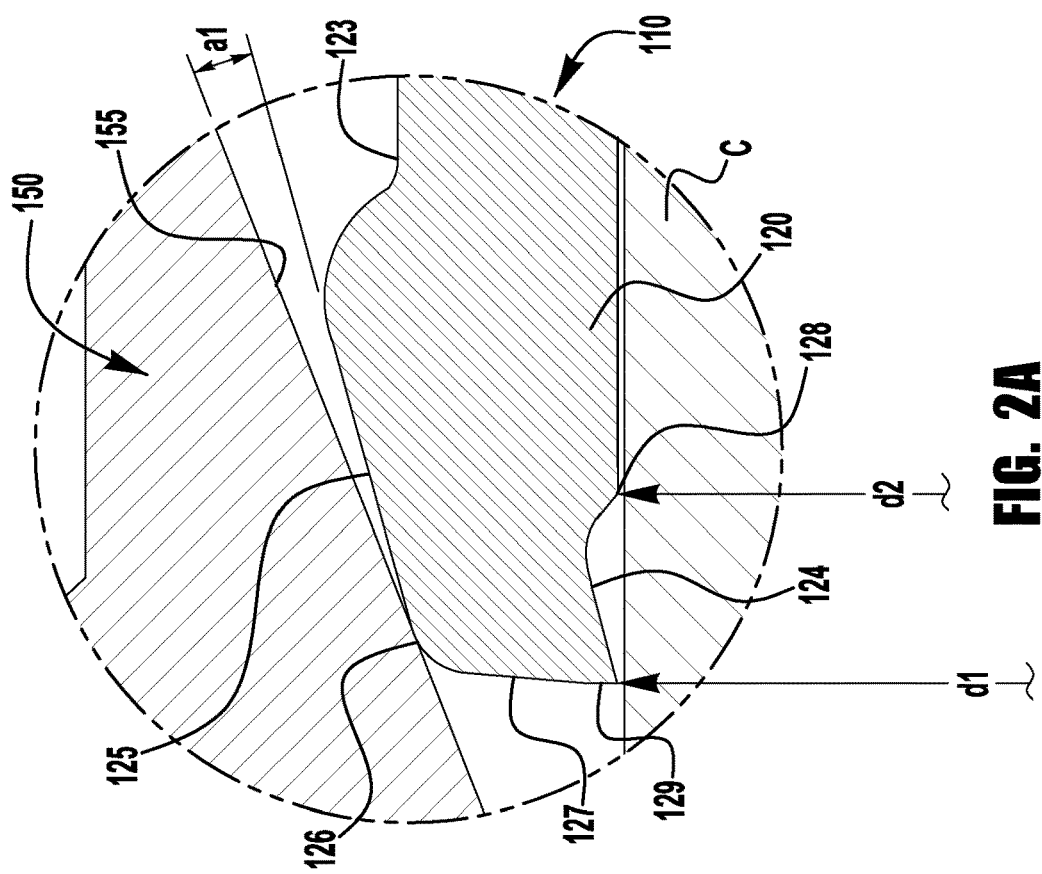
FIG. 2A is an enlarged view of the circled region of FIG. 2 labeled 2A.
Figure 3:
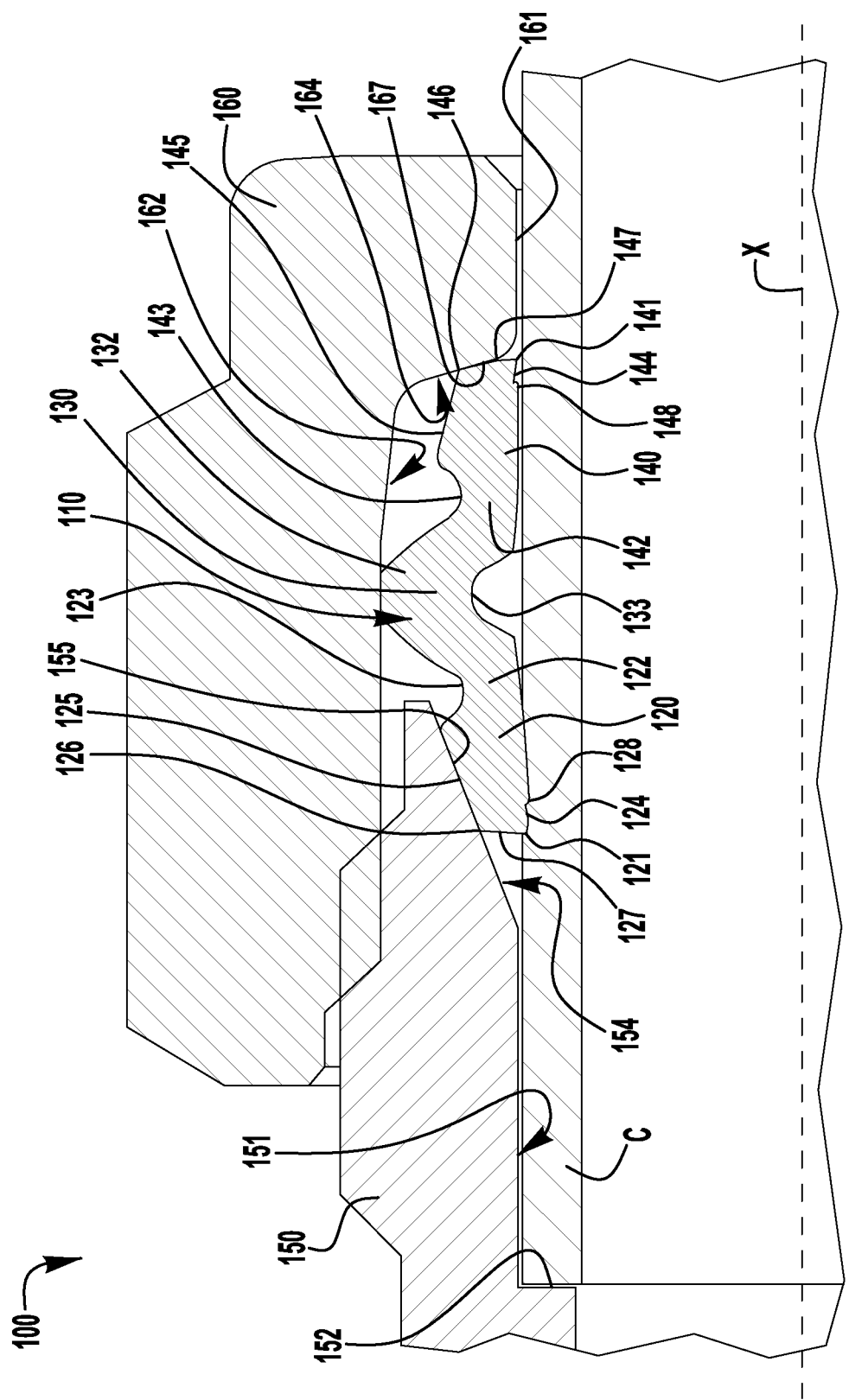
FIG. 3 is a half-longitudinal cross-sectional view of the conduit fitting assembly of FIG. 2, shown in a pulled-up condition.

FIGS. 2 and 3 illustrate an exemplary fitting assembly 100 including a single, reversible ferrule 110, a fitting body 150, and a fitting nut 160. The fitting body 150 includes a central longitudinal bore 151 that is sized to receive a conduit end C, which may bottom out against a counterbore 152 within the fitting body 150. The longitudinal bore 151 extends to a camming mouth 154 defining a body camming surface 155. The fitting nut 160 includes a central bore 161 sized to receive the conduit end C, and an internal shoulder 164 defining a drive surface 167.

The ferrule 110 includes an interior wall 115 extending between first and second end portions 120, 140 of the ferrule and along a central longitudinal axis X to receive the conduit end C. To allow the ferrule to function as a reversible ferrule, installable in the fitting assembly 100 with either of the first and second end portions 120, 140 engaging the fitting body 150 and the other of the first and second end portions 120, 140 engaging the fitting nut 160, each of the first and second end portions is provided with both a camming surface 125, 145 and a driven surface 127, 147. The first and second end camming surfaces 125, 145 are each contoured and positioned to engage the body camming surface 155 when the ferrule 110 is installed with the corresponding ferrule end portion 120, 140 facing the fitting body 150. The first and second end driven surfaces 127, 147 are each contoured and positioned to engage the nut drive surface 167 when the ferrule 110 is installed with the corresponding ferrule end portion 120, 140 facing the fitting nut 160. For consistent, reversible functionality, the first and second camming surfaces 125, 145 may be disposed at substantially equal (e.g., within manufacturing tolerances), opposed angles with respect to the central axis X. Likewise, the first and second driven surface 127, 147 may be disposed at substantially equal, opposed angles with respect to the central axis X.

In the illustrated embodiment, the first and second end driven surfaces 127, 147 are disposed radially inward and axially outward of the corresponding camming surfaces 125, 145, with the driven surface defining the axially outermost or endmost surfaces of the ferrule 110. The driven surfaces 127, 147 are disposed at a steeper angle (e.g., between 70° and 90°, or approximately 85°) with respect to the ferrule central axis X, to further limit or prevent radial inward compression of the nut engaging end portion of the ferrule 110, and the camming surfaces 125, 145 are disposed at a shallower angle (e.g., between 0° and 40°, or approximately) 15° with respect to the ferrule central axis X, to radially compress the body engaging end portion of the ferrule against the conduit end C. In the illustrated embodiment, the driven surfaces 127, 147 and camming surfaces 125, 145 are each substantially frustoconical, and the driven surfaces are joined with the corresponding camming surfaces by corresponding first and second radius portions 126, 146. In other embodiments, other contours (e.g., convex camming surface and/or driven surface) and geometries (e.g., stepped or cylindrical surface between the camming surface and the driven surface) may be utilized. In the illustrated embodiment, either or both of the endmost surfaces of the ferrule may be provided with substantially flat (i.e., perpendicular to the central axis X) end surfaces 129, 149, for example, to simplify machining of the ferrule 110.

When the ferrule 110 is installed in the fitting assembly 100 with the first end portion 120 facing the fitting body 150, and the fitting nut 160 is pulled up with the fitting body 150 on a conduit end C, the body camming surface 155 engages the first end camming surface 125 and the drive surface 167 engages the second end driven surface 147 to axially compress the ferrule between the fitting body and the fitting nut, and to radially compress the first end portion 120 of the ferrule and its biting edge 121 against the conduit end C. When the ferrule 110 is installed with the second end portion 140 facing the fitting body 150, and the fitting nut 160 is pulled up with the fitting body 150 on a conduit end C, the body camming surface 155 engages the second end camming surface 145 and the drive surface 167 engages the first end driven surface 127 to axially compress the ferrule between the fitting body and the fitting nut, and to radially compress the second end portion 140 of the ferrule and its biting edge 141 against the conduit end C.

As shown in FIG. 3, this axial compression causes first and second hinge portions 122, 142 of the ferrule 110 to hinge radially inward, radially compressing the hinge portion 122 adjacent the body engaging end portion of the ferrule into colleting engagement with the conduit end C, and causing the nut engaging end portion 142 of the ferrule to pivot radially outward about the hinge portion 142 adjacent to nut engaging end portion. In the illustrated embodiment, the hinge portions 122, 142 are narrowed with respect to, or necked down from, the end portions 120, 140 of the ferrule 110, defining outer circumferential notches or recesses 123, 143 that promote radially inward hinging at the hinge portions 122, 142, in response to axial compressive forces against the relatively larger ferrule end portions 120, 140.

To facilitate two discrete radially inward hinging actions at the axially spaced hinge portions 122, 142, the central portion 130 of the ferrule 110 includes an enlarged, radially extending central boss portion 132 to resist hinging deformation at this central portion and to concentrate hinging deformation at the narrowed hinge portions. The central portion 130 of the ferrule 110 also includes an interior central circumferential notch or recess 133, aligned with an axial center point of the ferrule, to further facilitate spaced hinging actions at the first and second hinge portions 122, 142 by promoting an accordion-like axial compression of the ferrule 110. The dual radial inward hinging and axial compression of the ferrule 110 during fitting pull-up causes a radially outward bowing of the central portion 130 of the ferrule between the hinge portions 122, 142. The enlarged central boss portion 132 of the ferrule 110 is sized to engage an interior wall 162 of the fitting nut 160 during fitting pull-up as a result of this radially outward bowing. This contact with the second fitting component may limit further outward bowing of the ferrule 110, and may provide additional hinging load to the hinge portions 122, 142, and additional colleting load to the hinge portion 122 adjacent the body engaging end portion 120 of the ferrule.

To further direct the biting edge of the body engaging ferrule end portion into biting engagement with the conduit end C, the camming surfaces 125, 145 may be contoured to engage the body camming surface 155 to form a radially outward opening difference angle a1. As the fitting is pulled up, the radial compressive forces from the body camming surface 155 are applied to a narrow band of contact on the camming surface of the body engaging end portion of the ferrule at the corresponding radius portion, causing this portion to deform radially inward, diminishing the difference angle a1 until a larger portion of the body engaging end camming surface engages and seals against the body camming surface 155. While any suitable difference angle a1 may be utilized, in one exemplary embodiment, the body camming surface 155 and the first and second end camming surfaces 125, 145 are contoured to provide a difference angle of between 0° and 15°. In one such embodiment, the body camming surface 155 is disposed at an angle of about 15° with respect to the central axis X, and the first and second end camming surfaces 125, 145 are each disposed at an angle of about 20° with respect to the central axis X, thereby providing a difference angle a1 of about 5° when the ferrule 110 is installed in the fitting 100 with either ferrule end portion 120, 140 facing the fitting body 150.

The end portions 120, 140 of the exemplary ferrule 110 are each provided an additional, axially inner biting edge or ring, extending around the ferrule interior wall, for additional biting engagement of the conduit end. Similar to the ferrule 10 shown in the schematic embodiment of FIGS. 1A and 1B, axially inward of the outer biting edges 121, 141 are circumferential notches or recesses 124, 144, axially spacing the outer biting edges from axially inner biting edges 128, 148, to form separate outer and inner biting rings of engagement between the body engaging end portion of the ferrule and the conduit end C during pull-up. As the radial compression of the body engaging end portion during pull-up is concentrated at the outer biting edge, the outer biting edges 121, 141 may be disposed at a larger diameter than the inner biting edges 128, 148, with this difference in biting edge diameters being selected to allow the outer and inner biting edges to contact the conduit end respectively synchronous during fitting pull-up. In other embodiments, as shown in FIG. 2C, a ferrule 110a may be provided without these circumferential notches, such that a single, outer biting ring is formed at the outer biting edges 121a, 141a during pull-up.

To further direct the nut engaging end portion away from engagement with the conduit end C, the end portions 120, 140 of the ferrule may each be provided with a driven surface 127, 147 that engages the nut drive surface 167 to form a radially inward opening difference angle a2. As the fitting is pulled up, the axial compressive forces from the nut drive surface 167 are applied to a narrow band of contact on the nut engaging end driven surface of the ferrule at the corresponding radius portion, causing the radially inward portion of the nut engaging end portion to deform axially and radially outward, diminishing the difference angle a2 until a larger portion of the second end driven surface engages against the component drive surface 167. While any suitable difference angle a2 may be utilized, in one exemplary embodiment, the nut drive surface 167 and the first and second end driven surfaces 127, 147 are contoured to provide a difference angle of between 0° and 20°. In one such embodiment, the nut drive surface is disposed at an angle of about 85° with respect to the central axis X, and the first and second end driven surfaces are each disposed at an angle of about 75° with respect to the central axis X, thereby providing a difference angle a2 of about 10° when the ferrule 110 is installed in the fitting 100 with either ferrule end portion 120, 140 facing the fitting nut 160.

Figure 4C:
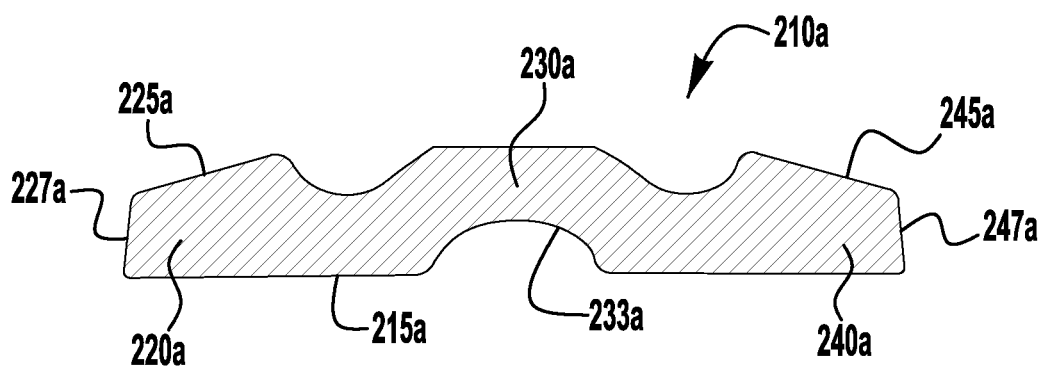
FIG. 4C is a half-longitudinal cross-section view of another ferrule for a conduit fitting assembly, duplicating some of the features of the ferrule of FIG. 4.
Figure 4:
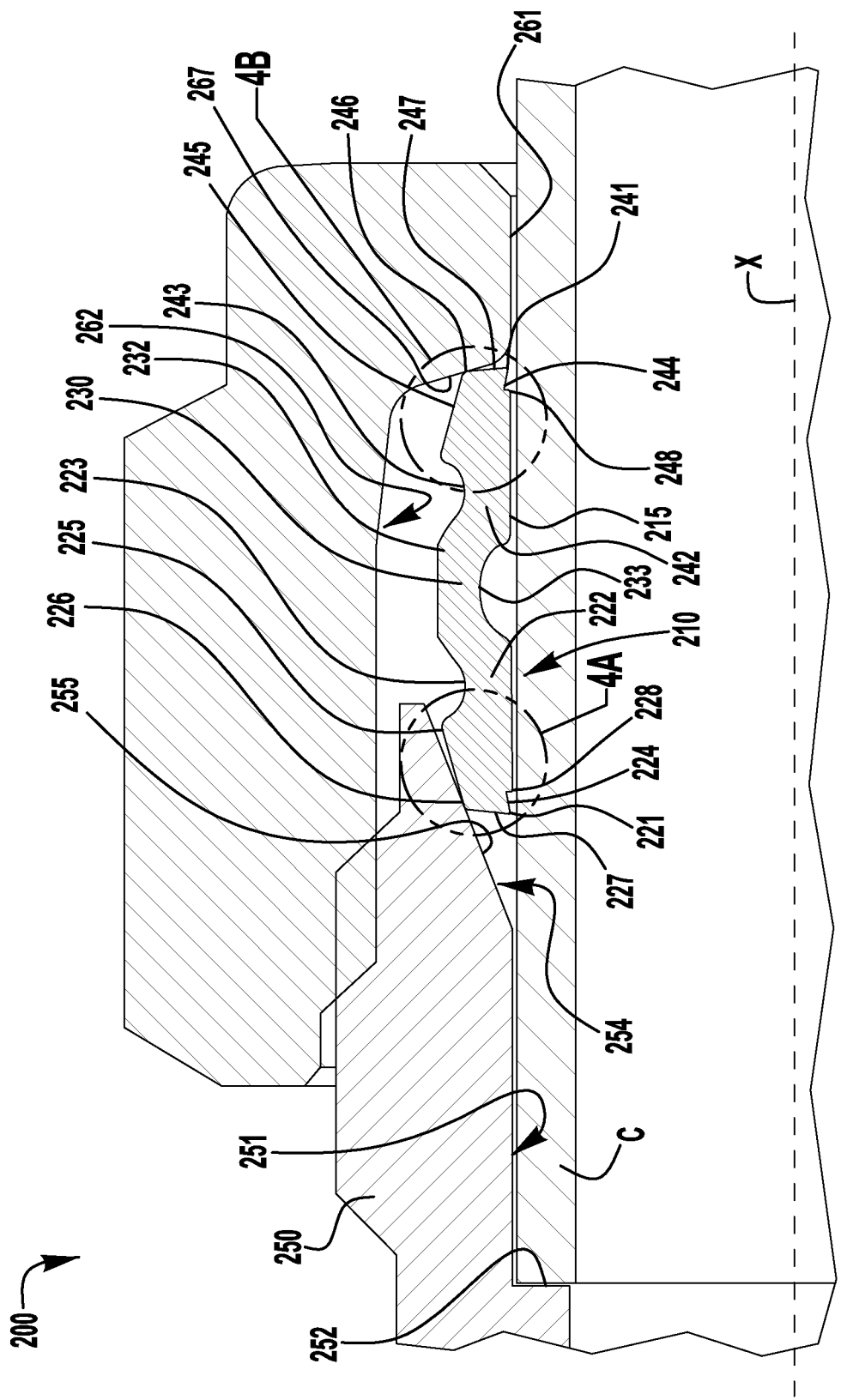
FIG. 4 is a half-longitudinal cross-sectional view of a conduit fitting assembly, shown in a finger tight condition.
Figure 5:
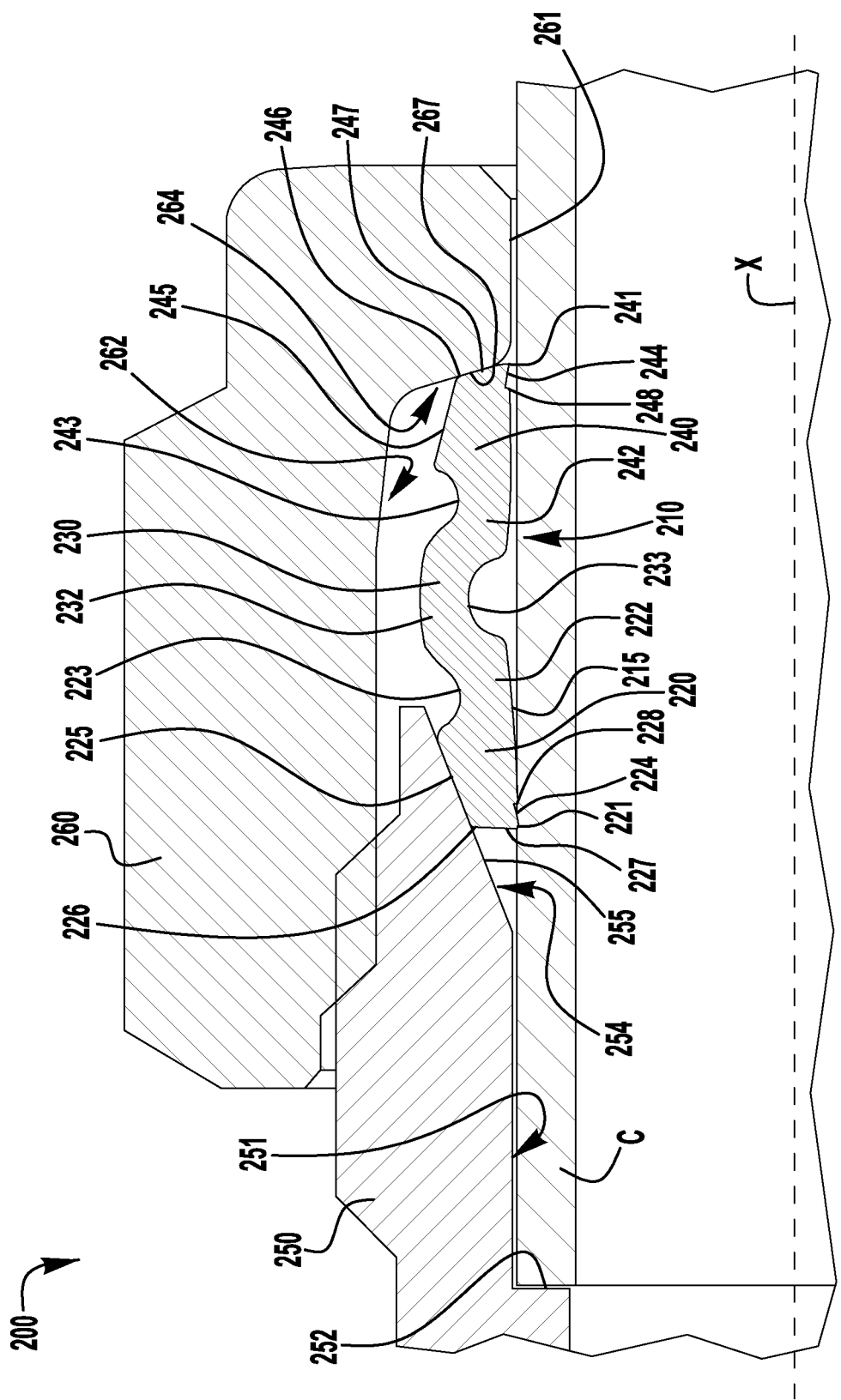
FIG. 5 is a half-longitudinal cross-sectional view of the conduit fitting assembly of FIG. 4, shown in a pulled-up condition.

FIGS. 4 and 5 illustrate an exemplary fitting assembly 200 including a single, reversible ferrule 210, a fitting body 250, and a fitting nut 260. The fitting body 250 includes a central longitudinal bore 251 that is sized to receive a conduit end C, which may bottom out against a counterbore 252 within the fitting body 250. The longitudinal bore 251 extends to a camming mouth 254 defining a body camming surface 255. The fitting nut 260 includes a central bore 261 sized to receive the conduit end C, and an internal shoulder 264 defining a drive surface 267.

The ferrule 210 includes an interior wall 215 extending between first and second end portions 220, 240 of the ferrule and along a central longitudinal axis X to receive the conduit end C. To allow the ferrule to function as a reversible ferrule, installable in the fitting assembly 200 with either of the first and second end portions 220, 240 engaging the fitting body 250 and the other of the first and second end portions 220, 240 engaging the fitting nut 260, each of the first and second end portions is provided with both an axially inner camming surface 225, 245 and an axially outer driven surface 227, 247. The first and second end camming surfaces 225, 245 are each contoured and positioned to engage the body camming surface 255 when the ferrule 210 is installed with the corresponding ferrule end portion 220, 240 facing the fitting body 250. The first and second end driven surfaces 227, 247 are each contoured and positioned to engage the nut drive surface 267 when the ferrule 210 is installed with the corresponding ferrule end portion 220, 240 facing the fitting nut 260.

In the illustrated embodiment, the first and second end driven surfaces 227, 247 are disposed radially inward and axially outward of the corresponding camming surfaces 225, 245, with the driven surface defining the axially outermost or endmost surfaces of the ferrule 210. The driven surfaces 227, 247 are disposed at a steeper angle (e.g., between 70° and 90°, or approximately 85°) with respect to the ferrule central axis X, to further limit or prevent radial inward compression of the nut engaging end portion of the ferrule 210, and the camming surfaces 225, 245 are disposed at a shallower angle (e.g., between 0° and 40°, or approximately) 15° with respect to the ferrule central axis, to radially compress the body engaging end portion of the ferrule against the conduit end C. In the illustrated embodiment, the driven surfaces 227, 247 and camming surfaces 225, 245 are each substantially frustoconical, and the driven surfaces are joined with the corresponding camming surfaces by corresponding first and second radius portions 226, 246. In other embodiments, other contours (e.g., convex camming surface and/or driven surface) and geometries (e.g., stepped or cylindrical surface between the camming surface and the driven surface) may be utilized. In the illustrated embodiment, either or both of the endmost surfaces of the ferrule may be provided with substantially flat (i.e., perpendicular to the central axis X) end surfaces 229, 249, for example, to simplify machining of the ferrule 210.

When the ferrule 210 is installed in the fitting assembly 200 with the first end portion 220 facing the fitting body 250, and the fitting nut 260 is pulled up with the fitting body 250 on a conduit end C, the body camming surface 255 engages the first end camming surface 225 and the drive surface 267 engages the second end driven surface 247 to axially compress the ferrule between the fitting body and the fitting nut, and to radially compress the first end portion 220 of the ferrule and its biting edge 221 against the conduit end C. When the ferrule 210 is installed with the second end portion 240 facing the fitting body 250, and the fitting nut 260 is pulled up with the fitting body 250 on a conduit end C, the body camming surface 255 engages the second end camming surface 245 and the drive surface 267 engages the first end driven surface 227 to axially compress the ferrule between the fitting body and the fitting nut, and to radially compress the second end portion 240 of the ferrule and its biting edge 241 against the conduit end C.

As shown in FIG. 5, this axial compression causes first and second hinge portions 222, 142 of the ferrule 210 to hinge radially inward, radially compressing the hinge portion adjacent the body engaging end portion of the ferrule into colleting engagement with the conduit end C, and causing the nut engaging end portion of the ferrule to pivot radially outward about the hinge portion adjacent to nut engaging end portion. In the illustrated embodiment, the hinge portions 222, 242 are narrowed with respect to, or necked down from, the end portions 220, 240 of the ferrule 210, defining outer circumferential notches or recesses 223, 243 that promote radially inward hinging at the hinge portions 222, 242, in response to axial compressive forces against the relatively larger ferrule end portions 220, 240.

To facilitate two discrete radially inward hinging actions at the axially spaced hinge portions 222, 242, the central portion 230 of the ferrule 210 includes an enlarged central boss portion 232 extending radially outward from the necked down hinge portions 222, 242 to resist hinging deformation at this central portion and to concentrate hinging deformation at the narrowed hinge portions. The central portion 230 of the ferrule 210 also includes an interior circumferential notch or recess 233 to further facilitate spaced hinging actions at the first and second hinge portions 222, 242 by promoting an accordion-like axial compression of the ferrule 210. The dual radial inward hinging and axial compression of the ferrule 210 during fitting pull-up causes a radially outward bowing of the central portion 130 of the ferrule between the hinge portions 122, 142. Unlike the enlarged central boss portion 132 of the ferrule 110 of FIGS. 2 and 3, the enlarged central boss portion 232 of the ferrule 210 of FIGS. 4 and 5 does not extend substantially radially outward of the ferrule end portions 220, 240. This allows for further bowing deformation of the central portion 230 during pull-up without engagement of the interior wall 262 of the fitting nut 260 by the boss portion 232.

To further direct the biting edge of the body engaging ferrule end portion into biting engagement with the conduit end C, the camming surfaces 225, 245 may be contoured to engage the body camming surface 255 to form a radially outward opening difference angle a1. As the fitting is pulled up, the radial compressive forces from the body camming surface 255 are applied to a narrow band of contact on the camming surface of the body engaging end portion of the ferrule at the corresponding radius portion, causing this portion to deform radially inward, diminishing the difference angle a1 until a larger portion of the body engaging end camming surface engages and seals against the body camming surface 255. While any suitable difference angle a1 may be utilized, in one exemplary embodiment, the body camming surface 255 and the first and second end camming surfaces 225, 245 are contoured to provide a difference angle of between 0° and 15°. In one such embodiment, the body camming surface 255 is disposed at an angle of about 15° with respect to the central axis X, and the first and second end camming surfaces 225, 245 are each disposed at an angle of about 20° with respect to the central axis X, thereby providing a difference angle a1 of about 5° when the ferrule 210 is installed in the fitting 200 with either ferrule end portion 220, 240 facing the fitting body 250.

The end portions 220, 240 of the exemplary ferrule 210 are each provided an additional, axially inner biting edge or rings for additional biting engagement of the conduit end. In the illustrated example, axially inward of the outer biting edges 221, 241 are circumferential notches 224, 244, axially spacing the outer biting edges from axially inner biting edges 228, 248, to form separate outer and inner biting rings of engagement between the body engaging end portion of the ferrule and the conduit end C during pull-up. As the radial compression of the body engaging end portion during pull-up is concentrated at the outer biting edge, the outer biting edges 221, 241 may be disposed at a larger diameter than the inner biting edges 228, 248, with this difference in biting edge diameters being selected to allow the outer and inner biting edges to contact the conduit end synchronously during fitting pull-up. In other embodiments, as shown in FIG. 4C, a ferrule 210a may be provided without these circumferential notches, such that a single, outer biting ring is formed at the outer biting edges 221a, 241a during pull-up.

To further direct the nut engaging end portion away from engagement with the conduit end C, the end portions 220, 240 of the ferrule may each be provided with a driven surface 227, 247 that engages the nut drive surface 267 to form a radially inward opening difference angle a2. As the fitting is pulled up, the axial compressive forces from the nut drive surface 267 are applied to a narrow band of contact on the nut engaging end driven surface of the ferrule at the corresponding radius portion, causing the radially inward portion of the nut engaging end portion to deform axially and radially outward, diminishing the difference angle a2 until a larger portion of the second end driven surface engages against the component drive surface 267. While any suitable difference angle a2 may be utilized, in one exemplary embodiment, the nut drive surface 267 and the first and second end driven surfaces 227, 247 are contoured to provide a difference angle of between 0° and 20°. In one such embodiment, the nut drive surface 267 is disposed at an angle of about 85° with respect to the central axis X, and the first and second end driven surfaces 227, 247 are each disposed at an angle of about 75° with respect to the central axis X, thereby providing a difference angle a2 of about 10° when the ferrule 210 is installed in the fitting 200 with either ferrule end portion 220, 240 facing the fitting nut 260.

Figure 6:
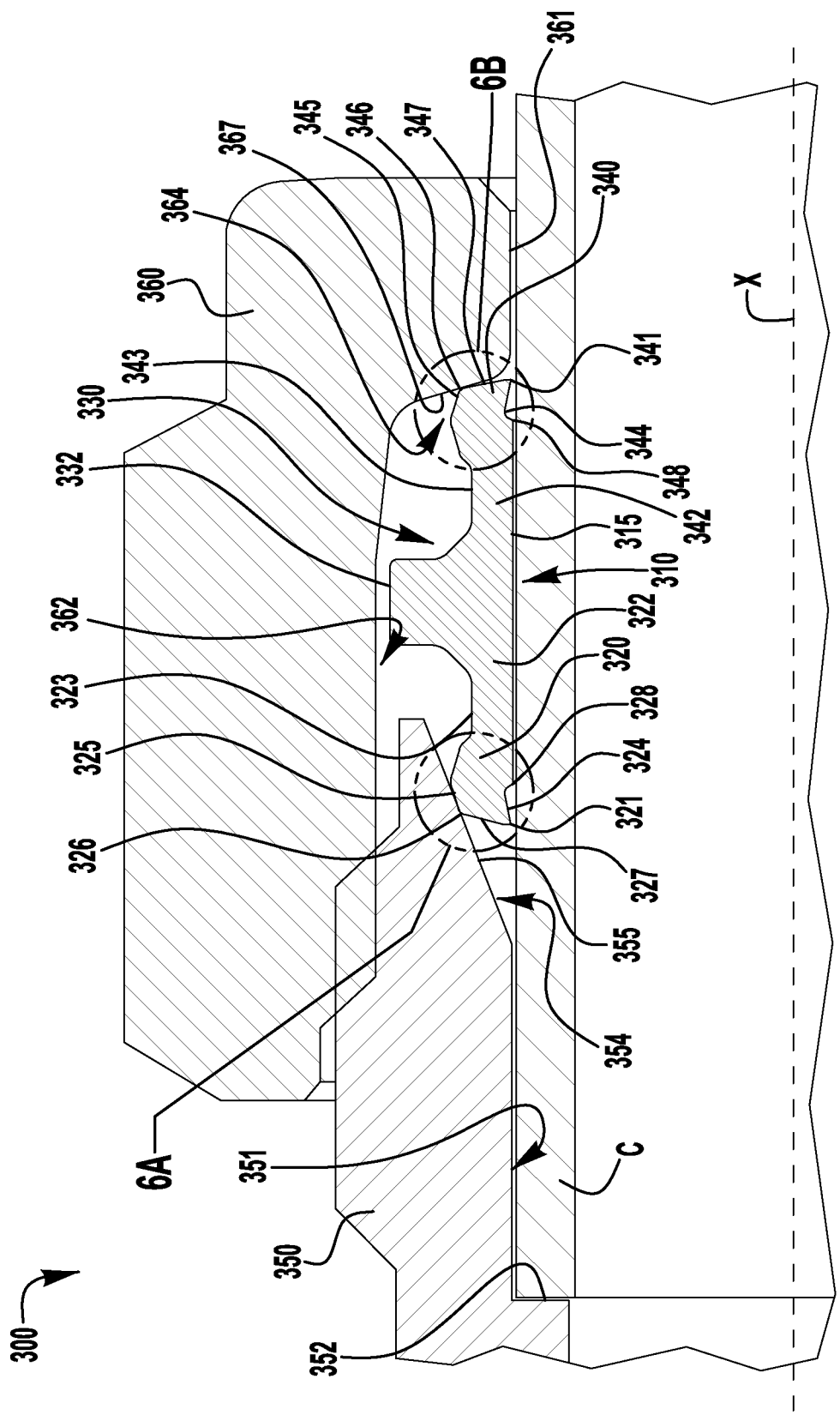
FIG. 6 is a half-longitudinal cross-sectional view of a conduit fitting assembly, shown in a finger tight condition.
Figure 7:
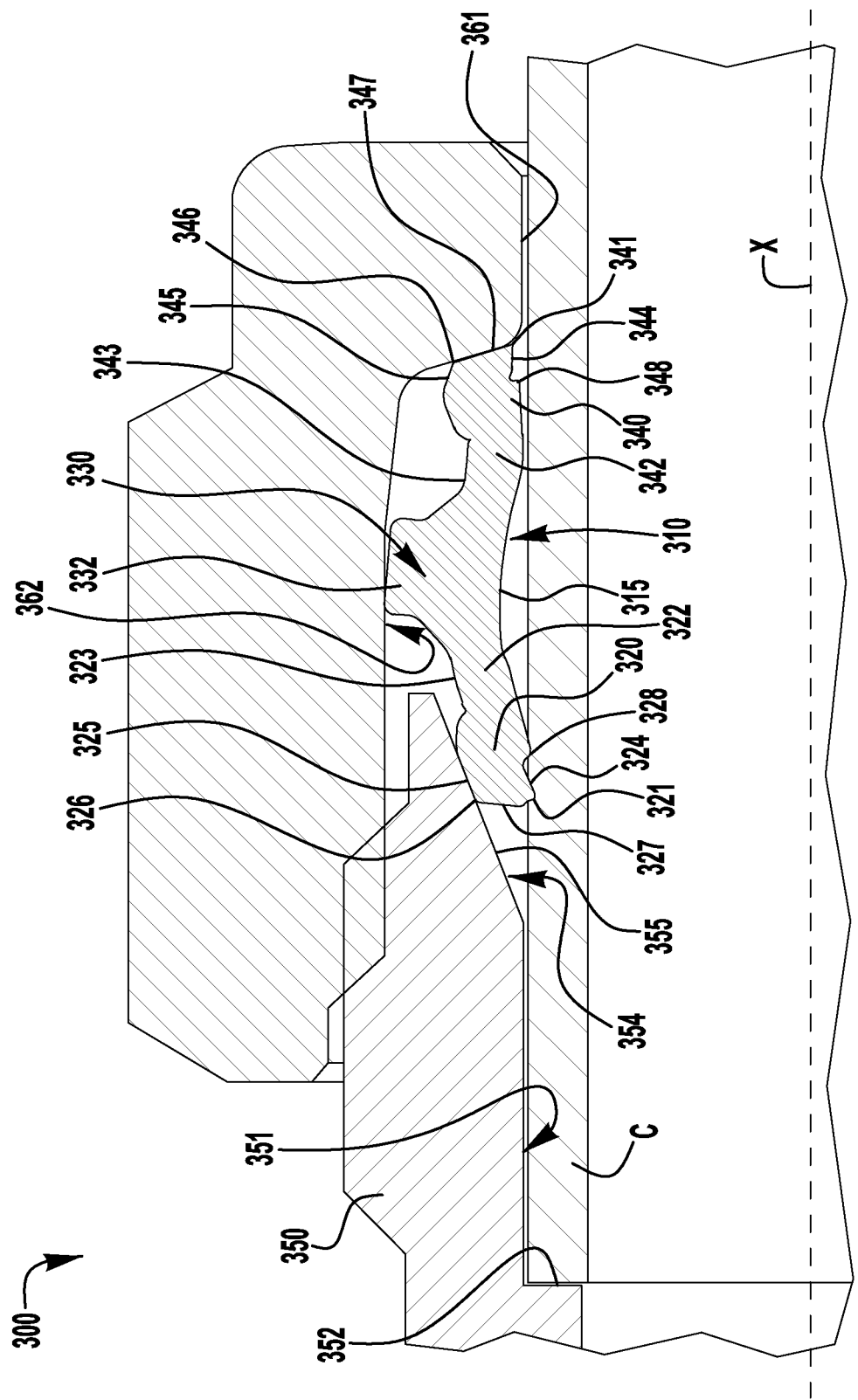
FIG. 7 is a half-longitudinal cross-sectional view of the conduit fitting assembly of FIG. 6, shown in a pulled-up condition.

FIGS. 6 and 7 illustrate an exemplary fitting assembly 300 including a single, reversible ferrule 310, a fitting body 350, and a fitting nut 360. The fitting body 350 includes a central longitudinal bore 351 that is sized to receive a conduit end C, which may bottom out against a counterbore 352 within the fitting body 350. The longitudinal bore 351 extends to a camming mouth 354 defining a body camming surface 355. The fitting nut 360 includes a central bore 361 sized to receive the conduit end C, and an internal shoulder 364 defining a drive surface 367.

The ferrule 310 includes an interior wall 315 extending between first and second end portions 320, 340 of the ferrule and along a central longitudinal axis X to receive the conduit end C. To allow the ferrule to function as a reversible ferrule, installable in the fitting assembly 300 with either of the first and second end portions 320, 340 engaging the fitting body 350 and the other of the first and second end portions 320, 340 engaging the fitting nut 360, each of the first and second end portions is provided with both a camming surface 325, 345 and a driven surface 327, 347. The first and second end camming surfaces 325, 345 are each contoured and positioned to engage the body camming surface 355 when the ferrule 310 is installed with the corresponding ferrule end portion 320, 340 facing the fitting body 350. The first and second end driven surfaces 327, 347 are each contoured and positioned to engage the nut drive surface 367 when the ferrule 310 is installed with the corresponding ferrule end portion 320, 340 facing the fitting nut 360.

In the illustrated embodiment, the first and second end driven surfaces 327, 347 are disposed radially inward and axially outward of the corresponding camming surfaces 325, 345, with the driven surface defining the axially outermost or endmost surfaces of the ferrule 310. The driven surfaces 327, 347 are disposed at a steeper angle (e.g., between 70° and 90°, or approximately 85°) with respect to the ferrule central axis X, to further limit or prevent radial inward compression of the nut engaging end portion of the ferrule 310, and the camming surfaces 325, 345 are disposed at a shallower angle (e.g., between 0° and 40°, or approximately) 15° with respect to the ferrule central axis, to radially compress the body engaging end portion of the ferrule against the conduit end C. In the illustrated embodiment, the driven surfaces 327, 347 and camming surfaces 325, 345 are each substantially frustoconical, and the driven surfaces are joined with the corresponding camming surfaces by corresponding first and second radius portions 326, 346. In other embodiments, other contours (e.g., convex camming surface and/or driven surface) and geometries (e.g., stepped or cylindrical surface between the camming surface and the driven surface) may be utilized. In the illustrated embodiment, either or both of the endmost surfaces of the ferrule may be provided with substantially flat (i.e., perpendicular to the central axis X) end surfaces 329, 349, for example, to simplify machining of the ferrule 310.

When the ferrule 310 is installed in the fitting assembly 300 with the first end portion 320 facing the fitting body 350, and the fitting nut 360 is pulled up with the fitting body 350 on a conduit end C, the body camming surface 355 engages the first end camming surface 325 and the drive surface 367 engages the second end driven surface 347 to axially compress the ferrule between the fitting body and the fitting nut, and to radially compress the first end portion 320 of the ferrule and its biting edge 321 against the conduit end C. When the ferrule 310 is installed with the second end portion 340 facing the fitting body 350, and the fitting nut 360 is pulled up with the fitting body 350 on a conduit end C, the body camming surface 355 engages the second end camming surface 345 and the drive surface 367 engages the first end driven surface 327 to axially compress the ferrule between the fitting body and the fitting nut, and to radially compress the second end portion 340 of the ferrule and its biting edge 341 against the conduit end C.

As shown in FIG. 7, this axial compression causes first and second hinge portions 322, 342 of the ferrule 310 to hinge radially inward, radially compressing the hinge portion 322 adjacent the body engaging end portion of the ferrule into colleting engagement with the conduit end C, and causing the nut engaging end portion 342 of the ferrule to pivot radially outward about the hinge portion 342 adjacent to nut engaging end portion. In the illustrated embodiment, the hinge portions 322, 342 are narrowed with respect to, or necked down from, the end portions 320, 340 of the ferrule 310, defining outer circumferential notches or recesses 323, 343 that promote radially inward hinging at the hinge portions 322, 342, in response to axial compressive forces against the relatively larger ferrule end portions 320, 340.

To facilitate two discrete radially inward hinging actions at the axially spaced hinge portions 322, 342, the central portion 330 of the ferrule 310 includes an enlarged, radially extending central boss portion 332 to resist hinging deformation at this central portion and to concentrate hinging deformation at the narrowed hinge portions. Unlike the ferrules 110, 210 of FIGS. 2-5, the central portion 330 of the ferrule 310 does not include a central interior recess (e.g., to facilitate machine manufacture of the ferrule 310), but instead relies on radially outward bowing of the central portion 330 and the necked down geometries of the hinge portions 322, 342 to facilitate the radially inward hinging of the hinge portions. The enlarged central boss portion 332 of the ferrule 310 is sized to engage an interior wall 362 of the fitting nut 360 during fitting pull-up as a result of this radially outward bowing. This contact with the second fitting component may limit further outward bowing of the ferrule 310, and may provide additional hinging load to the hinge portions 322, 342, and additional colleting load to the hinge portion 322 adjacent the body engaging end portion 320 of the ferrule.

To further direct the biting edge of the body engaging ferrule end portion into biting engagement with the conduit end C, the camming surfaces 325, 345 may be contoured to engage the body camming surface 355 to form a radially outward opening difference angle a1. As the fitting is pulled up, the radial compressive forces from the body camming surface 355 are applied to a narrow band of contact on the camming surface of the body engaging end portion of the ferrule at the corresponding radius portion, causing this portion to deform radially inward, diminishing the difference angle a1 until a larger portion of the body engaging end camming surface engages and seals against the body camming surface 355. While any suitable difference angle a1 may be utilized, in one exemplary embodiment, the body camming surface 355 and the first and second end camming surfaces 325, 345 are contoured to provide a difference angle of between 0° and 15°. In one such embodiment, the body camming surface 355 is disposed at an angle of about 15° with respect to the central axis X, and the first and second end camming surfaces 325, 345 are each disposed at an angle of about 20° with respect to the central axis X, thereby providing a difference angle a1 of about 5° when the ferrule 310 is installed in the fitting 300 with either ferrule end portion 320, 340 facing the fitting body 350.

Figure 6C:
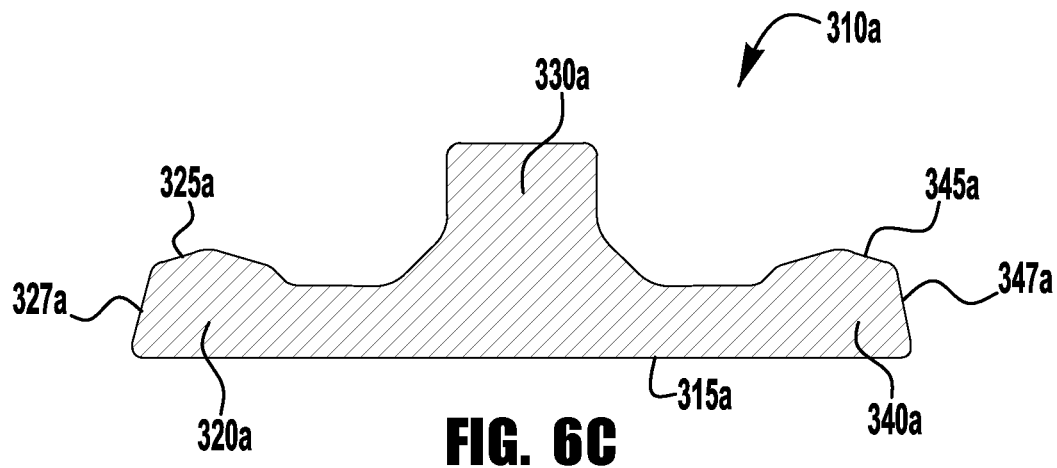
FIG. 6C is a half-longitudinal cross-section view of another ferrule for a conduit fitting assembly, duplicating some of the features of the ferrule of FIG. 6.

The end portions 320, 340 of the exemplary ferrule 310 are each provided an additional, axially inner biting edge or rings for additional biting engagement of the conduit end. In the illustrated example, axially inward of the outer biting edges 321, 341 are circumferential notches 324, 344, axially spacing the outer biting edges from axially inner biting edges 328, 348, to form separate outer and inner biting rings of engagement between the body engaging end portion of the ferrule and the conduit end C during pull-up. As the radial compression of the body engaging end portion during pull-up is concentrated at the outer biting edge, the outer biting edges 321, 341 may be disposed at a larger diameter than the inner biting edges 328, 348, with this difference in biting edge diameters being selected to allow the outer and inner biting edges to contact the conduit end synchronously during fitting pull-up. In other embodiments, as shown in FIG. 6C, a ferrule 310a may be provided without these circumferential notches, such that a single, outer biting ring is formed at the outer biting edges 321a, 341a during pull-up.

To further direct the nut engaging end portion away from engagement with the conduit end C, the end portions 320, 340 of the ferrule may each be provided with a driven surface 327, 347 that engages the nut drive surface 367 to form a radially inward opening difference angle a2. As the fitting is pulled up, the axial compressive forces from the nut drive surface 367 are applied to a narrow band of contact on the nut engaging end driven surface of the ferrule at the corresponding radius portion, causing the radially inward portion of the nut engaging end portion to deform axially and radially outward, diminishing the difference angle a2 until a larger portion of the second end driven surface engages against the component drive surface 367. While any suitable difference angle a2 may be utilized, in one exemplary embodiment, the nut drive surface 367 and the first and second end driven surfaces 327, 347 are contoured to provide a difference angle of between about 0° and about 20°. In one such embodiment, the nut drive surface is disposed at an angle of about 85° with respect to the central axis X, and the first and second end driven surfaces are each disposed at an angle of about 75° with respect to the central axis X, thereby providing a difference angle a2 of about 10° when the ferrule 310 is installed in the fitting 300 with either ferrule end portion 320, 340 facing the fitting nut 360.

In other embodiments, a fitting may be configured such that a drive surface of a fitting component (e.g., fitting nut) is positioned and oriented to engage a driven surface disposed on a central portion of a ferrule, instead of being disposed on an end portion of the ferrule as shown in the embodiments of FIGS. 1-7. In such an embodiment, according to another aspect of the present application, the ferrule may be configured to be functionally symmetrical or reversible within the fitting. In such an arrangement, the ferrule may be installed with an end portion of one of a first axial side and a second axial side of the ferrule engaging a camming surface of the first fitting component (e.g., fitting body), and a central driven surface of the other of the first and second axial sides engaging the drive surface of the second fitting component (e.g., fitting nut), such that the body engaging end portion provides an adequate front end grip and seal during pull-up. The second fitting component may be provided with a counterbore or other such configuration that prevents deformation of the end portion of the other of the first and second axial sides of the ferrule, to prevent rear end compression of the nut engaging end portion against the conduit end. By providing a functionally symmetrical or reversible ferrule configuration, a "foolproof" installation of the ferrule in a fitting may be offered, as the fitting would function properly with the ferrule installed in either direction.

Figure 8A:
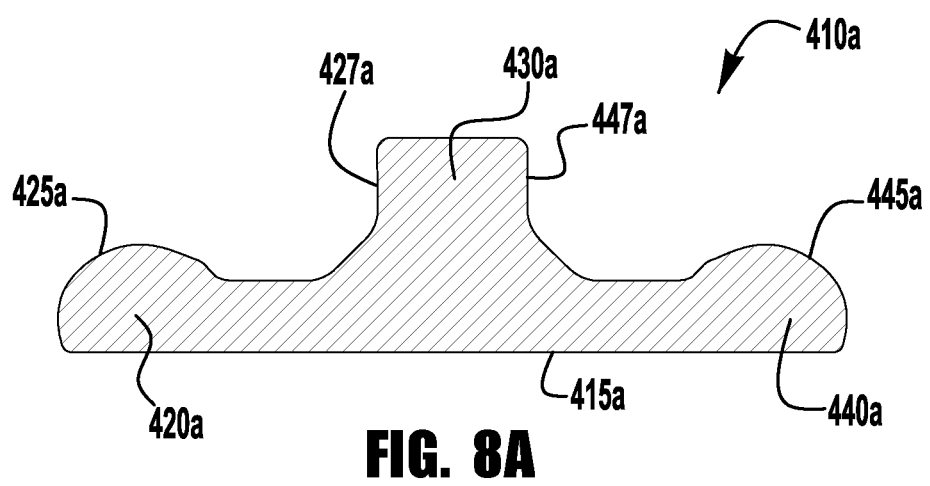
FIG. 8A is a half-longitudinal cross-section view of another ferrule for a conduit fitting assembly, duplicating some of the features of the ferrule of FIG. 8.
Figure 8:
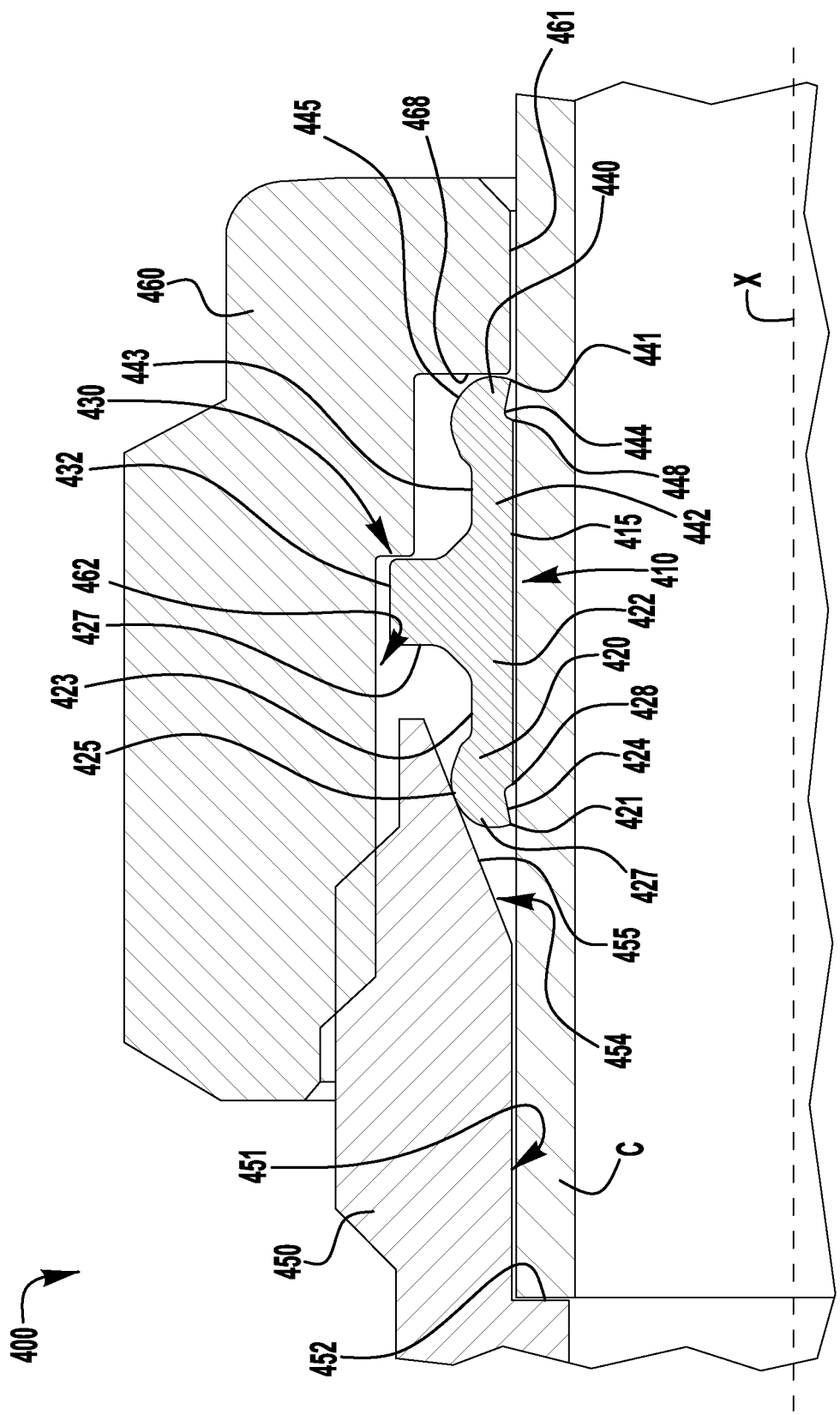
FIG. 8 is a half-longitudinal cross-sectional view of a conduit fitting assembly, shown in a finger tight condition.
Figure 9:
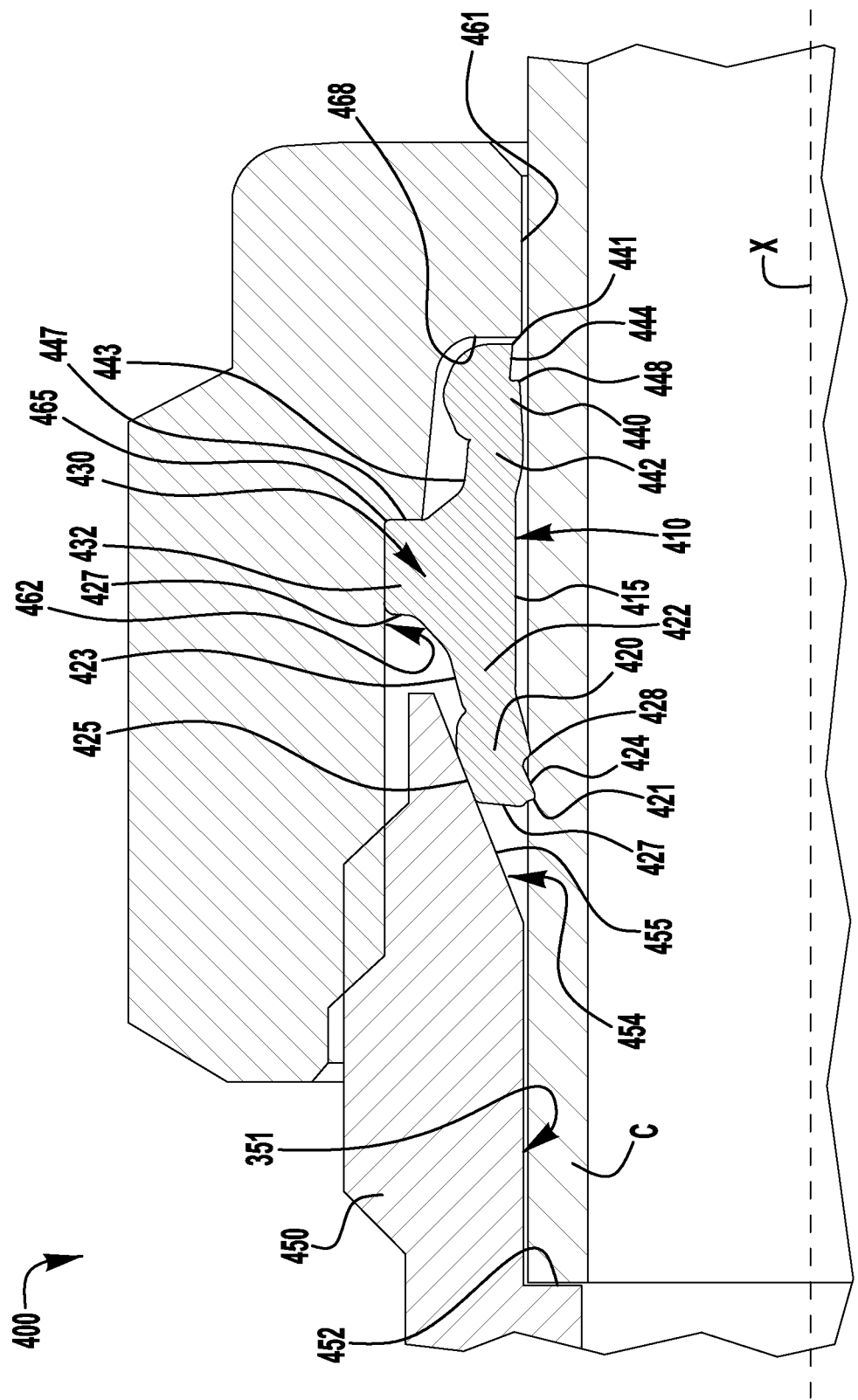
FIG. 9 is a half-longitudinal cross-sectional view of the conduit fitting assembly of FIG. 8, shown in a pulled-up condition.

FIGS. 8 and 9 illustrate an exemplary fitting assembly 400 including a single, reversible ferrule 410, a fitting body 450, and a fitting nut 460. The fitting body 450 includes a central longitudinal bore 451 that is sized to receive a conduit end C, which may bottom out against a counterbore 452 within the fitting body 450. The longitudinal bore 451 extends to a camming mouth 454 defining a body camming surface 455. The fitting nut 460 includes a central bore 461 sized to receive the conduit end C, an internal shoulder defining a drive surface 467, and a counterbore 468 outboard of the drive surface 467.

The ferrule 410 includes an interior wall 415 extending between first and second end portions 420, 440 of the ferrule and along a central longitudinal axis X to receive the conduit end C. To allow the ferrule to function as a reversible ferrule, installable in the fitting assembly 400 with either of the first and second end portions 420, 440 engaging the fitting body 450, each of the first and second end portions is provided with a camming surface 425, 445, and a central boss portion 432 is provided with opposed first and second driven surfaces 427, 447. The first and second end camming surfaces 425, 445 are each contoured and positioned to engage the body camming surface 455 when the ferrule 410 is installed with the corresponding ferrule end portion 420, 440 facing the fitting body 450. The first and second driven surfaces 427, 447 of the central boss portion 432 are each contoured and positioned to engage the nut drive surface 567 when the ferrule 510 is installed with the corresponding ferrule end portion 520, 540 facing the fitting nut 560.

In the illustrated embodiment, the first and second driven surfaces 427, 447 extend substantially radially (e.g., between about 70° and about 90°, or about 85°) with respect to the ferrule central axis X, for engagement with the radially extending drive surface 467 to limit or prevent radial inward compression of the nut engaging central portion of the ferrule 410, and the camming surfaces 425, 445 are disposed at a shallower angle (e.g., between about 0° and about 40°, or approximately 15°) with respect to the ferrule central axis, to radially compress the body engaging end portion of the ferrule against the conduit end C. In an exemplary embodiment, the camming surfaces 425, 445 and the drive surfaces 427, 447 are each substantially frustoconical. In other embodiments, other contours (e.g., convex) and geometries (e.g., stepped or cylindrical surfaces) may be utilized. In the illustrated embodiment, either or both of the endmost surfaces of the ferrule may be provided with substantially flat (i.e., perpendicular to the central axis X) end surfaces, for example, to simplify machining of the ferrule 410.

When the ferrule 410 is installed in the fitting assembly 400 with the first end portion 420 facing the fitting body 450, and the fitting nut 460 is pulled up with the fitting body 450 on a conduit end C, the body camming surface 455 engages the first end camming surface 425 and the drive surface 467 engages the second driven surface 447 to axially compress the ferrule between the fitting body and the fitting nut, and to radially compress the first end portion 420 of the ferrule and its biting edge 421 against the conduit end C. When the ferrule 410 is installed with the second end portion 440 facing the fitting body 450, and the fitting nut 460 is pulled up with the fitting body 450 on a conduit end C, the body camming surface 455 engages the second end camming surface 445 and the drive surface 467 engages the first driven surface 427 to axially compress the ferrule between the fitting body 450 and the fitting nut 460, and to radially compress the second end portion 440 of the ferrule and its biting edge 441 against the conduit end C.

As shown in FIG. 9, this axial compression causes the hinge portions 422 of the body engaging end 420 of the ferrule 410 to hinge radially inward, radially compressing the hinge portion 422 adjacent the body engaging end portion of the ferrule into colleting engagement with the conduit end C, while the hinge portion 442 of the nut engaging end of the ferrule remains relatively undeformed due to clearance between the end portion 440 and the counterbore 468. In the illustrated embodiment, the hinge portions 422, 442 are narrowed with respect to, or necked down from, the end portions 420, 440 of the ferrule 410, defining outer circumferential notches or recesses 423, 443 that promote radially inward hinging at the hinge portions 422, 442 (of the body engaging end of the ferrule), in response to axial compressive forces against the relatively larger ferrule end portions 420, 440.

While the ferrule 410 of the exemplary embodiment of FIGS. 8 and 9 is shown as duplicating many of the contours and elements of the ferrule 310 of FIGS. 6 and 7, other suitable contours and elements may be utilized, including, for example, one or more of the contours and elements of the ferrules of FIGS. 1-5.

To further direct the biting edge of the body engaging ferrule end portion into biting engagement with the conduit end C, the camming surfaces 425, 445 may be contoured to engage the body camming surface 455 to form a radially outward opening difference angle. As the fitting is pulled up, the radial compressive forces from the body camming surface 455 are applied to a narrow band of contact on the camming surface of the body engaging end portion of the ferrule at the corresponding radius portion, causing this portion to deform radially inward, diminishing the difference angle until a larger portion of the body engaging end camming surface engages and seals against the body camming surface 455. While any suitable difference angle may be utilized, in one exemplary embodiment, the body camming surface 455 and the first and second end camming surfaces 425, 445 are contoured to provide a difference angle of between about 0° and about 15°. In one such embodiment, the body camming surface 455 is disposed at an angle of about 15° with respect to the central axis X, and the first and second end camming surfaces 425, 445 are each disposed at an angle of about 20° with respect to the central axis X, thereby providing a difference angle of about 5° when the ferrule 410 is installed in the fitting 400 with either ferrule end portion 420, 440 facing the fitting body 450.

The end portions 420, 440 of the exemplary ferrule 410 are each provided an additional, axially inner biting edge or rings for additional biting engagement of the conduit end. In the illustrated example, axially inward of the outer biting edges 421, 441 are circumferential notches 424, 444, axially spacing the outer biting edges from axially inner biting edges 428, 448, to form separate outer and inner biting rings of engagement between the body engaging end portion of the ferrule and the conduit end C during pull-up. As the radial compression of the body engaging end portion during pull-up is concentrated at the outer biting edge, the outer biting edges 421, 441 may be disposed at a larger diameter than the inner biting edges 428, 448, with this difference in biting edge diameters being selected to allow the outer and inner biting edges to contact the conduit end synchronously during fitting pull-up. In other embodiments, as shown in FIG. 8A, a ferrule 410a may be provided without these circumferential notches, such that a single, outer biting ring is formed at the outer biting edges 421a, 441a during pull-up.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A ferrule for a conduit fitting, the ferrule comprising:
   an interior wall extending along a central axis through the ferrule between first and second end portions of the ferrule, so that the ferrule can be installed over a conduit end;
   the first end portion of the ferrule including an axially outer first end driven surface disposed at a first angle between 70° and 90° with respect to the central axis, and an axially inner first end camming surface disposed at a second angle between 0° and 40° with respect to the central axis;
   the second end portion of the ferrule including an axially outer second end driven surface disposed at a third angle substantially equal to the first angle, and an axially inner second end camming surface disposed at a fourth angle substantially equal to the second angle;
   wherein the ferrule further comprises a central boss portion extending radially outward to define a radially outermost surface at an axial center point of the ferrule, first and second hinge portions defining first and second outer circumferential recesses disposed between the first and second end portions and the central boss portion, and an interior circumferential notch disposed between the first and second hinge portions at the axial center point of the ferrule.

2. The ferrule of claim 1, wherein the first end driven surface and the first end camming surface are joined by a first radius portion, and the second end driven surface and the second end camming surface are joined by a second radius portion.

3. The ferrule of claim 1, wherein the ferrule is symmetrical about a plane that bisects an axial center point of the ferrule.

4. The ferrule of claim 1, wherein the first end driven surface and the second end driven surface are frustoconical.

5. The ferrule of claim 1, wherein the first end camming surface and the second end camming surface are frustoconical.

6. The ferrule of claim 1, wherein the ferrule comprises stainless steel.

7. The ferrule of claim 1, wherein at least a portion of the ferrule is case hardened.

8. The ferrule of claim 7, wherein the second end portion includes a second end outer biting edge extending around the interior wall.

9. The ferrule of claim 1, wherein the first end portion includes a first end outer biting edge extending around the interior wall.

10. The ferrule of claim 9, wherein the first end portion includes a first end inner biting edge extending around the interior wall, the first end inner biting edge being axially spaced from the first end outer biting edge by a first circumferential recess in the interior wall.

11. The ferrule of claim 10, wherein the first end outer biting edge is disposed at a first diameter and the first end inner biting edge is disposed at a second diameter smaller than the first diameter.

12. The ferrule of claim 1, wherein the ferrule is rotationally symmetrical about the central axis.

13. A fitting assembly comprising:
   a first fitting component including an interior bore for receiving a conduit end and a camming mouth defining a fitting component camming surface;
   a second fitting component joinable with the first fitting component and including an interior bore for receiving the conduit end therethrough and an annular interior shoulder that forms a drive surface; and
   a ferrule comprising an interior wall extending along a central axis through the ferrule between first and second end portions of the ferrule, so that the ferrule can be installed over the conduit end, the ferrule further including a first hinge portion axially inward of the first end portion and a second hinge portion axially inward of the second end portion;
   wherein when the fitting assembly is assembled with the first end portion of the ferrule engaging the first fitting component and the second end portion of the ferrule engaging the second fitting component, and the fitting assembly is completely installed on a conduit end, the first hinge portion of the ferrule hinges radially inward to collet the conduit end and the second hinge portion of the ferrule hinges radially inward to prevent compression of the second end portion of the ferrule against the conduit end; and
   wherein when the fitting assembly is assembled with the second end portion of the ferrule engaging the first fitting component and the first end portion of the ferrule engaging the second fitting component, and the fitting assembly is completely installed on a conduit end, the second hinge portion of the ferrule hinges radially inward to collet the conduit end and the first hinge portion of the ferrule hinges radially inward to prevent compression of the first end portion against the conduit end.

14. The fitting assembly of claim 13, wherein:
   the first end portion of the ferrule includes a first end driven surface disposed at a first angle between 70° and 90° with respect to the central axis and positioned to engage the drive surface of the second fitting component when the fitting assembly is assembled with the second end portion of the ferrule engaging the first fitting component and the first end portion of the ferrule engaging the second fitting component, and
   the second end portion of the ferrule includes a second end driven surface disposed at a second angle with respect to the central axis, the second angle being substantially equal to the first angle, and positioned to engage the drive surface of the second fitting component when the fitting assembly is assembled with the first end portion of the ferrule engaging the first fitting component and the second end portion of the ferrule engaging the second fitting component.

15. The fitting assembly of claim 13, wherein:
when the fitting assembly is assembled with the second end portion of the ferrule engaging the first fitting component and the first end portion of the ferrule engaging the second fitting component, the first end driven surface engages the drive surface of the second fitting component to form a radially inward opening difference angle between the first end driven surface and the drive surface, the difference angle diminishing during installation of the conduit fitting on the conduit end, and when the fitting assembly is assembled with the first end portion of the ferrule engaging the first fitting component and the second end portion of the ferrule engaging the second fitting component, the second end driven surface engages the drive surface of the second fitting component to form a radially inward opening difference angle between the second end driven surface and the drive surface, the difference angle diminishing during installation of the fitting on the conduit end.

16. The fitting assembly of claim 15, wherein the difference angle is between 0° and 20°.

17. The fitting assembly of claim 13, wherein:
the first end portion of the ferrule includes a first end camming surface disposed at a third angle between 0° and 40° with respect to the central axis and positioned to engage the fitting component camming surface of the first fitting component when the fitting assembly is assembled with the first end portion of the ferrule engaging the first fitting component and the second end portion of the ferrule engaging the second fitting component, and the second end portion of the ferrule includes a second end camming surface disposed at a fourth angle with respect to the central axis, the fourth angle being substantially equal to the second angle, and positioned to engage the fitting component camming surface of the first fitting component when the fitting assembly is assembled with the second end portion of the ferrule engaging the first fitting component and the first end portion of the ferrule engaging the second fitting component.

18. The fitting assembly of claim 17, wherein:
when the fitting assembly is assembled with the first end portion of the ferrule engaging the first fitting component and the second end portion of the ferrule engaging the second fitting component, the first end camming surface engages the fitting component camming surface of the first fitting component to form a radially outward opening difference angle between the first end camming surface and the fitting component camming surface, the difference angle diminishing during installation of the fitting on the conduit end, and when the fitting assembly is assembled with the second end portion of the ferrule engaging the first fitting component and the first end portion of the ferrule engaging the second fitting component, the second end camming surface engages the fitting component camming surface of the first fitting component to form a radially outward opening difference angle between the second end camming surface and the fitting component camming surface, the difference angle diminishing during installation of the fitting on the conduit end.

19. The fitting assembly of claim 18, wherein the difference angle is between 0° and 15°.

20. The fitting assembly of claim 13, wherein the ferrule is symmetrical about a plane that bisects an axial center point of the ferrule.

* * * * *